United States Patent
Corliano et al.

(10) Patent No.: US 7,924,716 B2
(45) Date of Patent: Apr. 12, 2011

(54) METHOD AND SYSTEM FOR COORDINATION OF ADMISSION CONTROL IN TRANSPORT NETWORKS

(75) Inventors: Gabriele Corliano, Ipswich (GB); Peter Hovell, Woodbridge (GB); Robert J Briscoe, Woodbridge (GB)

(73) Assignee: British Telecommunications public limited company, London (GB)

( * ) Notice: Subject to any disclaimer, the term of this patent is extended or adjusted under 35 U.S.C. 154(b) by 250 days.

(21) Appl. No.: 12/294,627

(22) PCT Filed: Feb. 27, 2007

(86) PCT No.: PCT/GB2007/000672
§ 371 (c)(1),
(2), (4) Date: Sep. 26, 2008

(87) PCT Pub. No.: WO2007/110568
PCT Pub. Date: Oct. 4, 2007

(65) Prior Publication Data
US 2010/0172239 A1     Jul. 8, 2010

(30) Foreign Application Priority Data
Mar. 27, 2006  (EP) ..................... 06251628

(51) Int. Cl.
*H04J 1/16* (2006.01)
(52) U.S. Cl. ............. 370/230; 709/229
(58) Field of Classification Search ........ 370/230, 370/229, 231, 232, 233, 234, 235, 310, 312, 370/328, 351, 389, 395.2, 395.21; 709/227, 709/228, 229
See application file for complete search history.

(56) References Cited

U.S. PATENT DOCUMENTS
2004/0082338 A1*  4/2004  Norrgard et al. ......... 455/452.2
2006/0133272 A1*  6/2006  Yuan et al. ................. 370/230

FOREIGN PATENT DOCUMENTS
EP    1 589 696        10/2005
WO    02/056564         7/2002
WO    02/056564 A1      7/2002

OTHER PUBLICATIONS

International Search Report for PCT/GB2007/000672, mailed May 31, 2007.
Wen-Tsuen, C. et al., "A bandwidth reservation protocol for hard QoS guaranteed differentiated services", ICC 2001, vol. 1, pp. 1792-1796, (Jun. 11, 2001).
European Search Report completed Aug. 31, 2006 in EP 06 25 1628.

* cited by examiner

*Primary Examiner* — Huy D Vu
*Assistant Examiner* — Dady Chery
(74) *Attorney, Agent, or Firm* — Nixon & Vanderhye P.C.

(57) ABSTRACT

The invention provides a coordination layer of coordinating entities provided intermediate the admission control interfaces of the transport network domains, and any QoS signaller which signals QoS requests on behalf of the application layer. The coordination layer acts to distribute an admission control request across the multiple transport network domains by the use of coordination request messages containing the admission control request being forwarded through the coordination layer of coordinating entities. At each coordinating entity the admission control request is passed on to the admission control interface of the transport network which the coordinating entity serves, and an admission control response obtained. This admission control response is then combined with admission control responses from the other domains which are propagated through the coordination layer via coordination messages. The result is that the coordination layer acts to combine the various admission control responses into a combined response, which can be provided back to the QoS signaller (or other requesting entity). Thus, coordination of admission control across multiple transport network domains is achieved, without a QoS signaller having to contact each individual domain.

54 Claims, 22 Drawing Sheets

| Service | Service features | Service invocation | IntServ translation | DiffServ translation |
|---|---|---|---|---|
| Elastic | As-soon-as possible treatment | No invocation – default service | Best effort | Best effort |
| Real-time intolerant | Guaranteed min rate, guaranteed max delay, very low jitter, no loss | Traffic characterisation, service request | Guaranteed (TSPEC, RSPEC) | Expedited forwarding (TSPEC, RSPEC) |
| Real-time tolerant | Low loss, high rate within traffic envelope | Traffic characterisation | Controlled load (TSPEC) | Assured forwarding (TSPEC) |

Figure 8

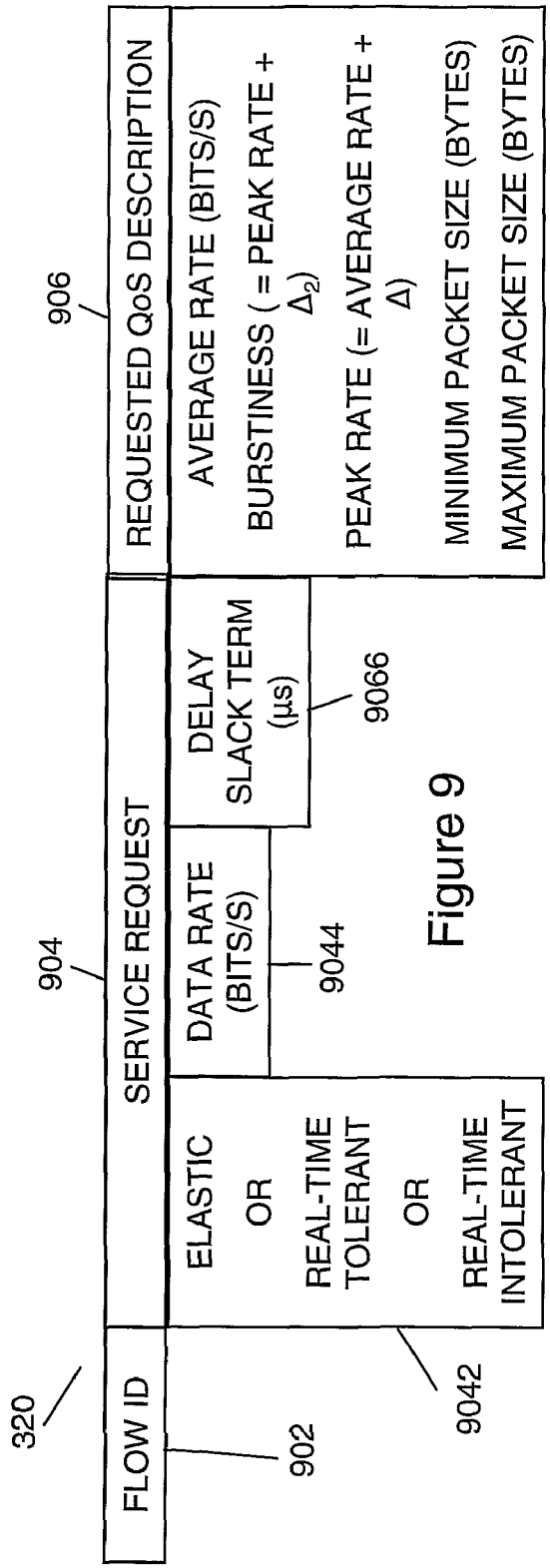
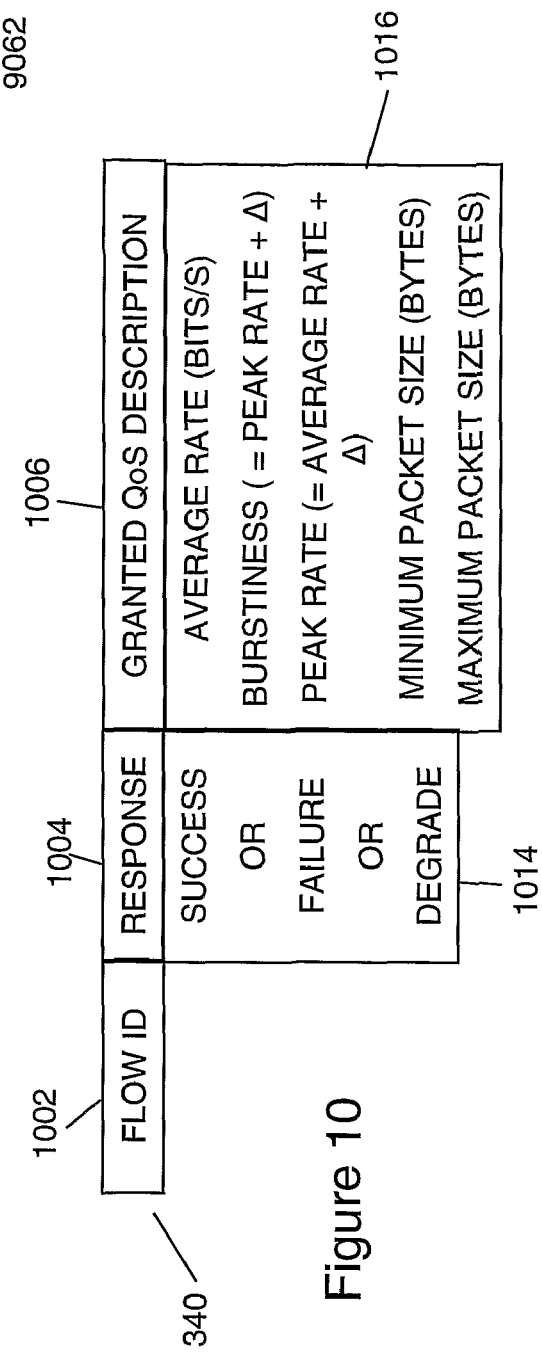
Figure 9
Figure 10

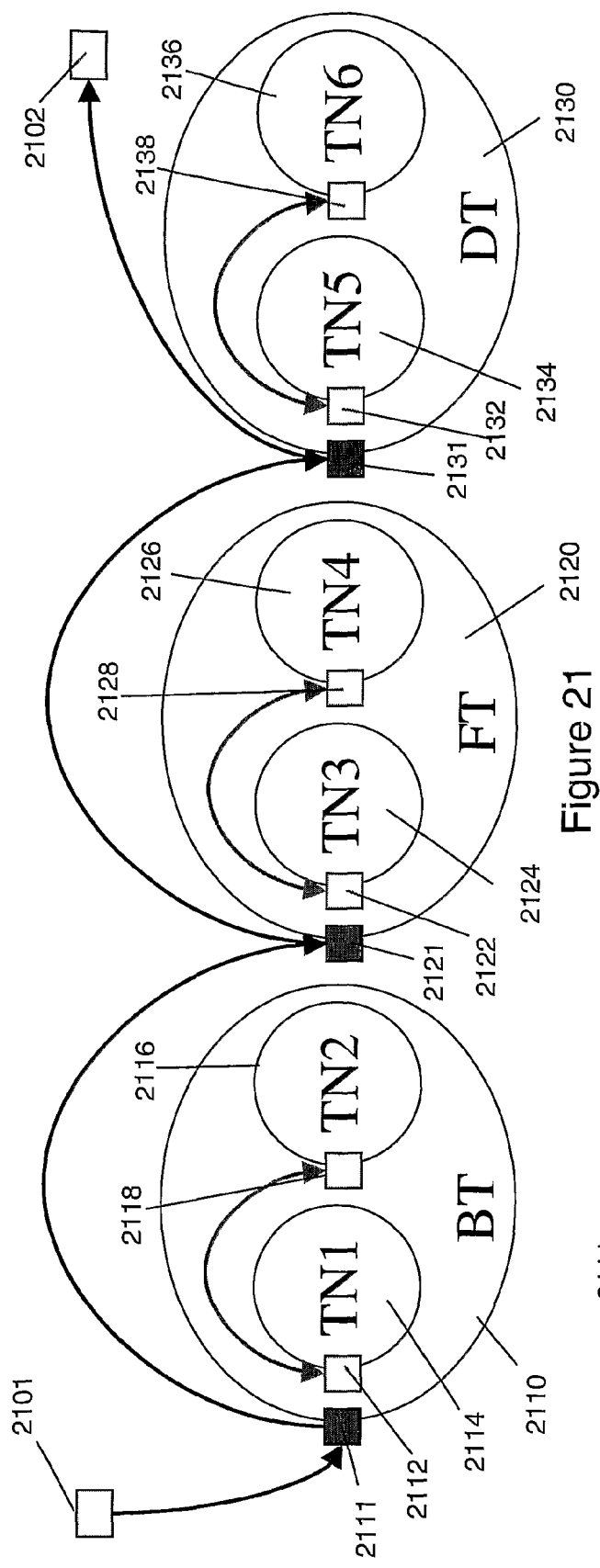
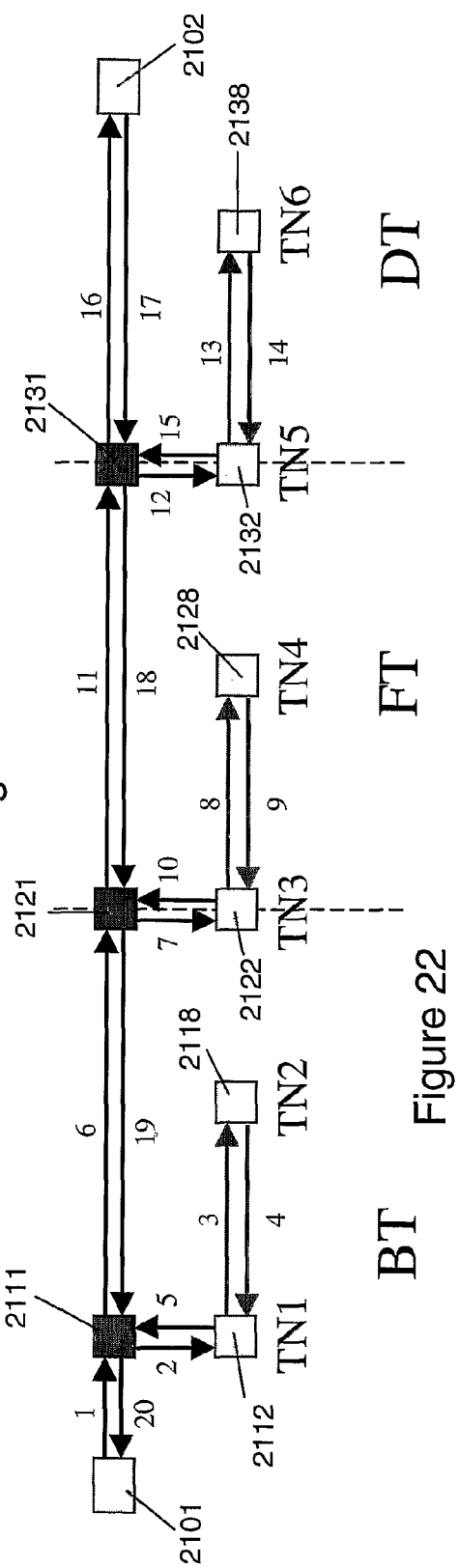
Figure 21
Figure 22

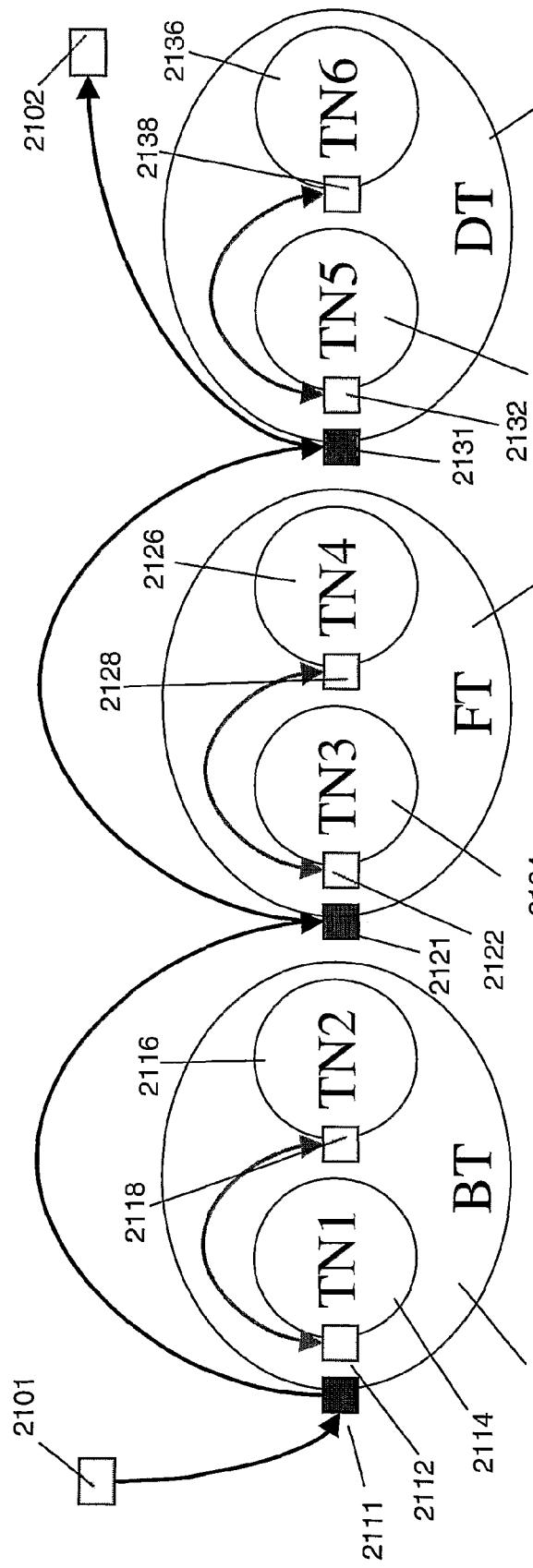
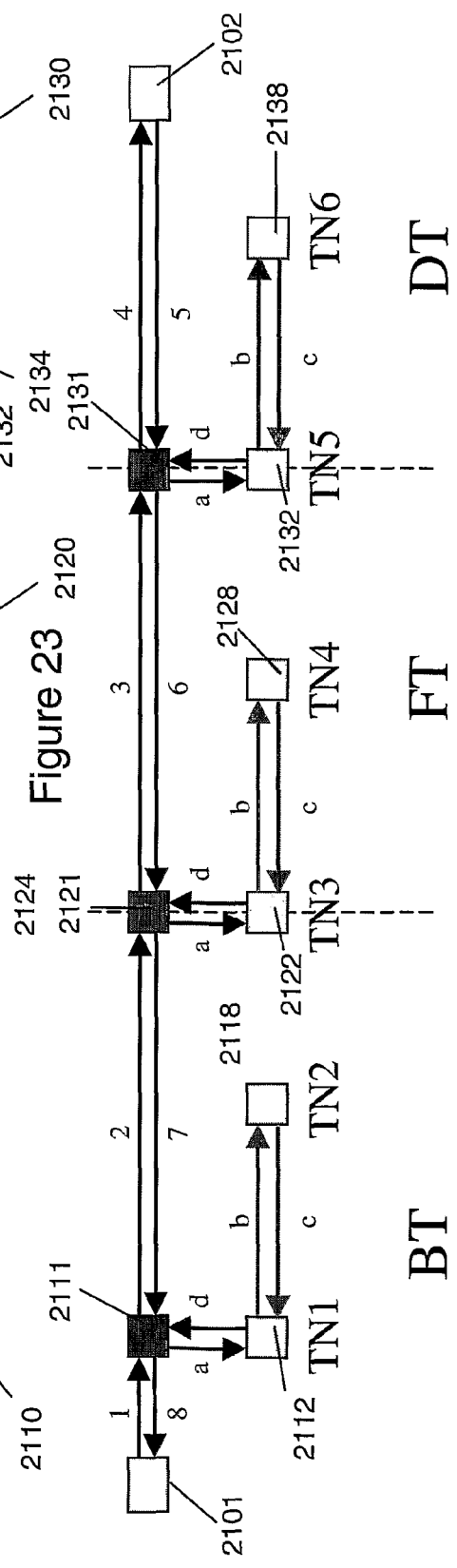
Figure 23
Figure 24

METHOD AND SYSTEM FOR COORDINATION OF ADMISSION CONTROL IN TRANSPORT NETWORKS

This application is the U.S. national phase of International Application No. PCT/GB2007/000672, filed 27 Feb. 2007, which designated the U.S. and claims priority to filed Europe Application No. 06251628.1, filed 27 Mar. 2006, the entire contents of each of which are hereby incorporated by reference.

TECHNICAL FIELD

The present invention relates to a method and system for coordinating request and/or response messages used for admission control requests and responses in a transport network. In particular, within embodiments of the invention quality of service messages can be collated and/or coordinated irrespective of the form of the quality of service definition used.

BACKGROUND TO THE INVENTION AND PRIOR ART

Within a network such as an Internet Protocol (IP) network a stream of packets from a source application to a destination application is called a flow. How the packets forming a flow should be dealt with by the transport network depends very much on the needs of the application, which in turn defines the needs of each flow. Four parameters can usually be defined to specify the performance metrics required of the transport network by a flow, being the bandwidth required (the data rate), delay (being how long the network takes to transport a packet from source to destination), jitter (being the variation, such as standard deviation, in packet arrival times with respect to packet transmission times), and reliability (in terms of the extent to which the flow can tolerate packet loss). Together these parameters define the quality of service (QoS) the flow requires. A particular quality of service which any particular flow requires in terms of the characteristics of the four parameters noted above will depend on the application from which the flow is being sent or received. For example, an email application may require high reliability, but have low expectations for bandwidth, delay, or jitter, whereas a video conferencing application will have much higher expectations in respect of delay, jitter, and bandwidth, but can tolerate a degree of packet loss.

Much work has been undertaken in the past by members of the Internet Engineering Task Force (IETF) to formulate mechanisms for the provision of quality of service in transport networks, and in particular IP networks. One branch of this work led to a number of flow based QoS mechanisms, known as "Integrated Services". These are described in a number of IETF RFCs, and in particular RFCs 2205 to 2210. Two specific types of flow based QoS were considered under the auspices of integrated services, being the "Guaranteed Delivery" service described in IETF proposed standard RFC 2212, and the "Controlled Load Delivery" service described in IETF RFC 2211. The characteristics of the Guaranteed Delivery service and the controlled load delivery service are shown in the table given in FIG. 12. In particular, Guaranteed Delivery provides a fixed bandwidth, together with a fixed upper bound for delay. Very low jitter is also provided, and the service is assured in that there should be no packet loss. The Guaranteed Delivery service therefore represents a high quality of service from the transport network.

For Controlled Load delivery, no rate guarantees are given but limits are placed on packet delay, jitter, and loss in that a low delay and jitter, and little loss are specified. The main IETF protocol for the provision of the Integrated Services architecture is the resource reservation protocol (RSVP) described in RFC 2205, RFC 2210, and others.

As described in RFC 2210, an application instance participating in an RSVP session as a data sender registers with RSVP. One piece of information provided by the application instance is the Sender TSpec describing the traffic the application expects to generate. This information is used to construct an RSVP SENDER_TSPEC object, which is included in RSVP PATH messages generated for the application.

The sending application also constructs an initial RSVP ADSPEC object. This adspec carries information about the QoS control capabilities and requirements of the sending application itself, and forms the starting point for the accumulation of path properties described below. The ADSPEC is added to the RSVP PATH message created at the sender.

Typically the default ADSPEC supplied by the host RSVP in this case would support all QoS control services known to the host, however the exact behavior of this mechanism is implementation dependent.

The ADSPEC is modified by subsequent network elements as the RSVP PATH message moves from sender to receiver(s). At each network element, the ADSPEC is passed from RSVP to the traffic control module. The traffic control module updates the ADSPEC, which may contain data for several QoS control services, by identifying the services mentioned in the ADSPEC and calling each such service to update its portion of the ADSPEC. If the traffic control module discovers a QoS control service mentioned in the ADSPEC but not implemented by the network element, a flag is set to report this to the receiver. The updated ADSPEC is then returned to RSVP for delivery to the next hop along the path.

Upon arrival of the PATH message at an application receiver, the data in the SENDER_TSPEC and ADSPEC objects is passed across the RSVP API to the application. The application (perhaps with the help of a library of common resource-reservation functions) interprets the arriving data, and uses it to guide the selection of resource reservation parameters.

An application receiver wishing to make a resource reservation supplies its local RSVP with the necessary reservation parameters. Among these are the QoS control service desired (Guaranteed or Controlled-Load), the traffic specifier (TSpec) describing the level of traffic for which resources should be reserved, and, if needed by the selected QoS control service, an RSpec describing the level of service desired. These parameters are composed into an RSVP FLOWSPEC object and transmitted upstream by RSVP.

At each RSVP-aware point in the network, the SENDERTSPECs arriving in PATH messages and the FLOWSPECs arriving in RESV messages are used to request an appropriate resource reservation from the desired, QoS control service. State merging, message forwarding, and error handling proceed according to the rules of the RSVP protocol.

Finally, the merged FLOWSPEC object arriving at each of an RSVP session's data senders is delivered to the application to inform each sender of the merged reservation request and properties of the data path.

In addition to flow based algorithms such as Integrated Services, IETF also devised a class based quality of service architecture, known as "differentiated services" (DiffServ). With class based service entire classes of flows (e.g. Internet telephony flows) are provided with the same quality of service, thus meaning that the quality of service mechanism does not need to handle individual flows. In this respect, the DiffServ architecture is thought to be more straightforward than the Integrated Services architecture.

The choice of service classes in a DiffServ environment is up to each network operator, but IETF has defined network independent service classes. One particular service class is "Expedited Forwarding" described in RFC 3246. Expedited Forwarding, referred to as "EF", provides a fixed rate, with either low or no delay, jitter, or packet loss.

An alternative service class under the DiffServ architecture is "Assured Forwarding" described in RFC 2597 and referred to as "AF". Within Assured Forwarding four priority classes are prescribed, each class having its own resources. The four classes of packets are then subject to traffic shaping such as using leaky or token bucket algorithms to maintain the quality of service. The rate given by assured forwarding depends on other flows within the same class, and no guarantees are given for delay or jitter. However, packet loss is unlikely as long as traffic is within its specified envelope.

Whilst the Integrated Services and Differentiated Services architectures appear sound in theory, in practice they have proved difficult to apply, principally because they require the sending application to know the particular quality of service architecture used by the transport network. However, as apparent from the above, at least two different quality of service architectures have previously been proposed, within which other different mechanisms can be employed to provide QoS. Due to the proliferation of different technologies, therefore, QoS requester mechanisms have not been built into applications typically, due to the necessity to build in compatibility with all the different QoS architectures. However, any particular application has a general idea as to its QoS requirements in terms of whether it can accept an elastic service, a real time service but with packet loss, or a real time service but with no packet loss. Additionally, an application also tends to have an idea of its bandwidth and packet size characteristics. It would therefore be better to permit applications to specify QoS in a different form, which can then be translated into transport network technology specific QoS for the resource reservation.

Moreover, with the different types of QoS there is at present no integrated technique to allow for the coordination of admission control decisions over a large scale multi-domain network, where the individual domains may be employing different QoS architectures. RSVP as described above provides for the coordination of QoS in an Integrated Services architecture where every node is RSVP enabled, but is inherently limited to operation with RSVP-enabled nodes. Thus, if every node a flow must traverse is an RSVP node, then RSVP effectively co-ordinates the various QoS admission control decisions at those nodes. However, where multiple domains are involved which use different QoS architectures, e.g. a DiffServ architecture, or do not make any QoS reservations or guarantees at all, then RSVP is not able to provide co-ordination.

The paper "A Bandwidth Reservation Protocol for Hard QoS Guaranteed Differentiated Services" by Wen-Tsuen Chen, Chin-Fu Lin and Chung-Shih Tang (ICC 2001, IEEE International Conference on Communications, Helsinki, Finland, 11-14 Jun. 2001, Conference Record, pages 1792-1796), aims to provide a hard QoS guaranteed service with end-to-end behaviour across domains in DiffServ, and appears to partially describe a method to coordinate EF networks. The method uses different messages depending on whether the service concerned is EF or AF, so the protocols depend on the type of QoS.

Referring to prior patent documents, EP1589696 relates to systems and methods for implementing resource allocation in network communication, and aim to solve the end-to-end QOS problem through dividing a communication network into a plurality of QOS domains and managing them. WO02056564 relates to methods and systems for providing end-to-end QoS within a mobile telecommunication system comprising at least one network means such as a Core Network connected to at least one Radio Access Network using IP based transmission.

There is thus a need for a further signalling protocol and associated techniques to allow for the co-ordination of QoS related admission control across multiple domains, each of which may have different QoS architectures.

SUMMARY OF THE INVENTION

In view of the above, the present invention provides a coordination layer of coordinating entities provided intermediate the admission control interfaces of the transport network domains, and any QoS signaller which signals QoS requests on behalf of the application layer. The coordination layer acts to distribute an admission control request across the multiple transport network domains by the use of coordination request messages containing the admission control request being forwarded through the coordination layer of coordinating entities. At each coordinating entity the admission control request is passed on to the admission control interface of the transport network which the coordinating entity serves, and an admission control response obtained. This admission control response is then combined with admission control responses from the other domains which are propagated through the coordination layer via coordination messages. The result is that the coordination layer acts to combine the various admission control responses into a combined response, which can be provided back to the QoS signaller (or other requesting entity). Thus, coordination of admission control across multiple transport network domains is achieved, without a QoS signaller having to contact each individual domain.

In view of the above, from a first aspect the present invention provides a method of coordinating admission control signals across multiple transport network domains, comprising:—providing, for a transport network domain, at least one coordinator entity arranged to exchange admission control request and response messages with an admission control interface of the transport network domain for which it was provided; and exchanging coordination request and response messages between the coordinator entities of the multiple transport network domains to combine the admission control responses of the domains.

As noted above, the first aspect of the invention provides the advantage that coordination across multiple domains can be achieved, by admission control responses being merged into a single, combined response. Moreover, the coordination entities may be used to coordinate admission control irrespective of the QoS architectures employed by the individual transport networks, by virtue of the coordinator entities sitting above the transport network domains in a separate coordination layer. In this respect, the admission control requests and responses preferably comprise a QoS description, but that description can be in almost any form. Moreover, the coordination messages exchanged within the coordination layer are agnostic to the form of QoS description used.

In one embodiment of the invention the coordinator entity operates in a blocking mode, wherein for a received coordination request message containing an admission control request an admission control response is obtained from the network domain for which the coordinator entity acts, which response is combined with the admission control request before the coordination request message is forwarded on to a next coordinator entity for a next-hop transport network domain. Such operation therefore allows an admission control decision to be made for an early domain in a flow path prior to later domains, and for the results of that decision to combined into the admission control request which is forwarded onwards. In this manner, admission control responses from earlier domains can be propagated along the flow path in the form of the admission control request. The last hop domain can then respond back to a QoS signaller in the knowledge of the network reservations made by the earlier domains in the flow path, such that the response is indicative of the admission control responses made by all of the domains along the path.

In another embodiment the coordinator entity operates in a non-blocking mode, wherein a received coordination request message containing an admission control request is forwarded on to a next coordinator entity for a next-hop transport network domain prior to an admission control response being obtained from the network domain for which the coordinator entity acts. Such operation allows for admission control requests to be propagated to all the domains as quickly as possible.

Within the other embodiment, for a received coordination request message containing an admission control request an admission control response is obtained from the network domain for which the coordinator entity acts, which response is combined with an admission control response received in a coordination response message from the next coordinator entity for a next-hop transport network domain. Thus, here, instead the admission control responses are combined in the opposite direction to the blocking mode, in that each domain makes its own admission control response, and then the coordinators for the domains wait to receive from the next-hop coordinators the admission control response thereof. The respective responses are then combined, and propagated back up the flow path.

In embodiments of the invention the combining step preferably further comprises: comparing the admission control response with one of:—i) in blocking mode, the admission control request information; or ii) in non-blocking mode, the admission control response information received in the coordination response message; determining that information of the compared information which represents the minimum of the two; and producing the further coordination message containing admission control request or response information corresponding to the determined minimum information. Thus, when a domain is only able to grant a lower QoS than requested, the lower QoS level can be incorporated into the overall response.

In preferred embodiments of the invention a hierarchy of coordinator entities are provided, the hierarchy comprising a lowest layer of coordinator entities each of which acts for a single transport network domain, and one or more higher layers of coordinators, a coordinator in a higher layer acting to exchange messages with coordinators in the next lower layer, whereby to aggregate admission control responses from the multiple transport network domains. The use of a hierarchy of coordinators allows a coordinator to be assigned to each administrative domain, being a collection of transport network domains, coordination then being performed at the transport network level within any particular administrative domain, and then at the administrative domain level. Such an arrangement more accurately reflects the arrangement of real networks.

In embodiments of the invention the admission control request messages preferably contain information including a flow QoS description of requested QoS. Moreover, the admission control response messages also preferably contain information including a flow QoS description of granted QoS Preferably the flow QoS description comprises a first part indicating the requested or granted QoS type, and a second part comprising one or more requested QoS parameters. Such features allow for QoS requests and response to be incorporated into the admission control messages.

Preferably, the requested QoS type comprises an end-to-end type of service, being QoS types understood by the sending and receiving applications, rather than the particular transport networks. In preferred embodiments of the invention the end-to-end QoS type is selected from the group comprising: elastic; real-time tolerant; and real-time intolerant. With such an arrangement end-to-end QoS definitions can be mapped to transport network specific QoS, thus providing for further flexibility in application design and production.

From another aspect, the present invention provides a method of coordinating admission control messages across multiple transport network domains for performance by a coordinator entity acting for a local subset of one or more of the transport network domains, the method comprising the steps:—i) receiving at least one coordination request message containing admission control request information; ii) forwarding an admission control request message containing the admission control request information towards an admission control interface or functions of the subset of one or more of the transport network domains; iii) receiving an admission control response message containing local admission control response information derived from admission control responses of the or each of the local subset of transport network domains made in response to the admission control request information; iv) generating a further coordination message in dependence on at least the admission control response information; and v) transmitting the further coordination message.

Within this further aspect, the further features and advantages as previously described in respect of the first aspect may be obtained.

From another aspect the present invention also provides a computer program or suite of computer programs arranged such that when executed by a computer system it/they cause the computer system to operate in accordance with the method of any of the preceding aspects. Moreover there is also provided, according to the invention, a computer-readable storage medium storing the computer program or at least one of the suite of computer programs according to the aspect noted above. The computer readable storage medium may be any magnetic, optical, magneto-optical, solid-state, or other data storage medium known in the art.

Further aspects and features of the invention will be apparent from the appended claims.

BRIEF DESCRIPTION OF THE DRAWINGS

Further features and advantages of the present invention will be apparent from the following description of embodiments thereof, presented by way of example only, and by reference to the accompanying drawings, wherein like reference numerals refer to like parts, and wherein:—

FIG. 8 is a table allowing for the translation of end to end QoS requests into specific transport network QoS within an embodiment of the invention;

FIG. 9 is a diagram illustrating the format of an admission control request message used in an embodiment of the invention;

FIG. 10 is a diagram illustrating the format of an admission control response message used in an embodiment of the present invention;

FIG. 21 is another diagram illustrating a hierarchical arrangement of co-ordinating entities and administrative and transport network domains to which an embodiment of the invention is applied;

FIG. 22 is a diagram illustrating message exchanges across the hierarchical arrangement of FIG. 21 in a blocking mode of operation;

FIG. 23 is a hierarchical arrangement of administrative and transport network domains similar to that of FIG. 21;

FIG. 24 is a diagram depicting message exchange in a non-blocking mode of operation in a hierarchical embodiment of the invention.

DESCRIPTION OF THE EMBODIMENTS

Figure 1:
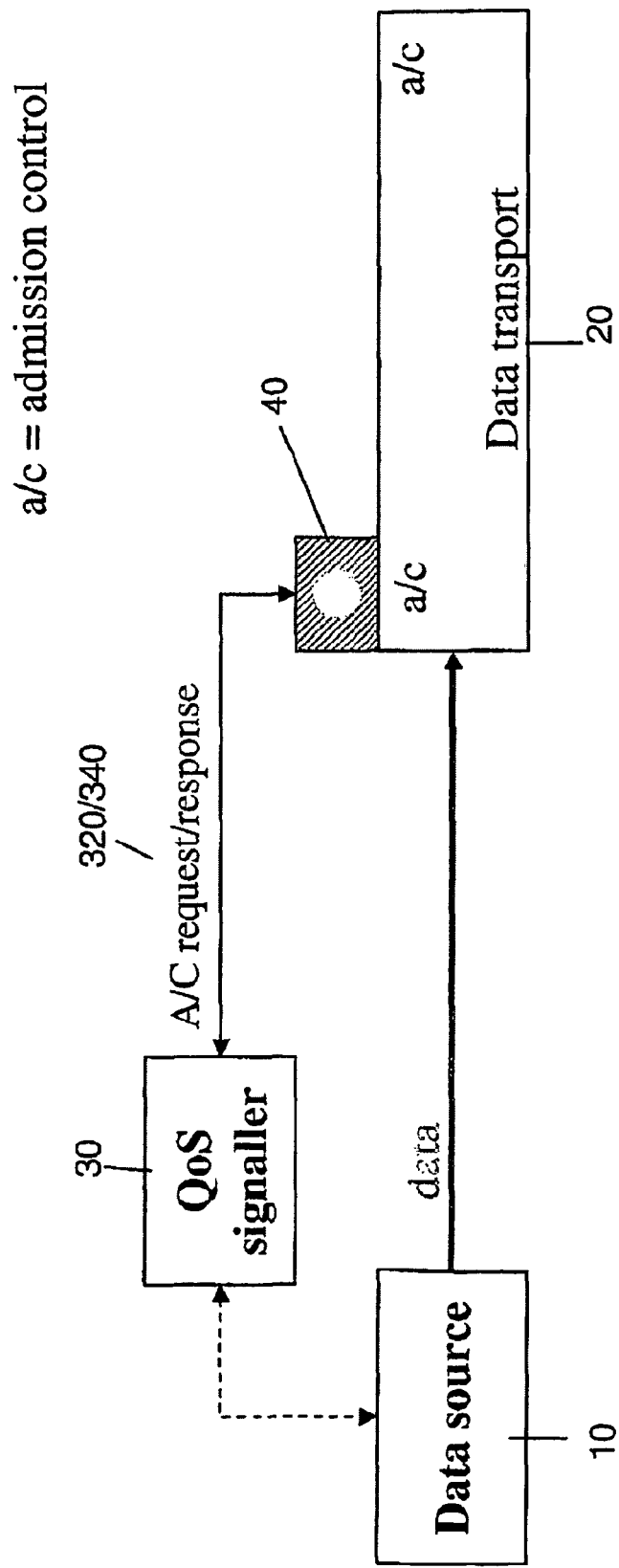
FIG. 1 is a diagram of the elements involved in admission control signalling of the prior art.

Prior to describing embodiments of the present invention, FIG. 1 illustrates a prior art architecture used for signalling admission control requests. Here, typically a data source 10 such as an application or the like provides an admission control request to a QoS signaller 30, which may be incorporated in the application, or may alternatively be a stand alone entity installed either on the same machine, or some different machine, for example one connected to the machine hosting the data source 10 via a LAN. The QoS signaller 30 sends admission control requests to the admission control interface 40 of the data transport network 20, wherein the requests from the QoS signaller 30 must contain the necessary information and be in the correct format so as to be compatible with the QoS mechanism specifically used by the data transport network 20. Thus, for example, where the data transport network 20 uses the integrated services architecture using RSVP, the QoS signaller 30 must send admission control requests to the network admission control entity 40 using RSVP.

To alleviate the above noted drawbacks of the prior art, embodiments of the present invention provide a "co-ordination layer" of co-ordinator entities, with at least one co-ordinator entity being provided for each domain. As will become apparent from embodiments to be described, a co-ordinator entity is provided for each transport network domain, and the co-ordinator entities may be hierarchically arranged to reflect the administrative collection of transport network domains into administrative domains. The provision of the co-ordination layer provides for a QoS signaller to make a single admission control request, which is then distributed through the co-ordination layer by the action of the co-ordinator entities, and for admission control responses from transport network domain admission control interfaces to be aggregated and combined into a single co-ordinated admission control response. Moreover, the co-ordinator layer of the embodiments of the invention is not dependent on any particular QoS architecture, and hence can be used to co-ordinate and combine admission control requests amongst transport network domains of different QoS architectures. In this respect, the co-ordinator layer message formats contain a field in which a QoS description can be carried, but do not care as to the exact form of the QoS description. Therefore, in contrast to, for example, RSVP, embodiments of the invention provide an additional, independent, co-ordination layer which sits on top of the transport network domain admission control interfaces, and is not tied to any particular QoS architecture thereof.

Figure 2:
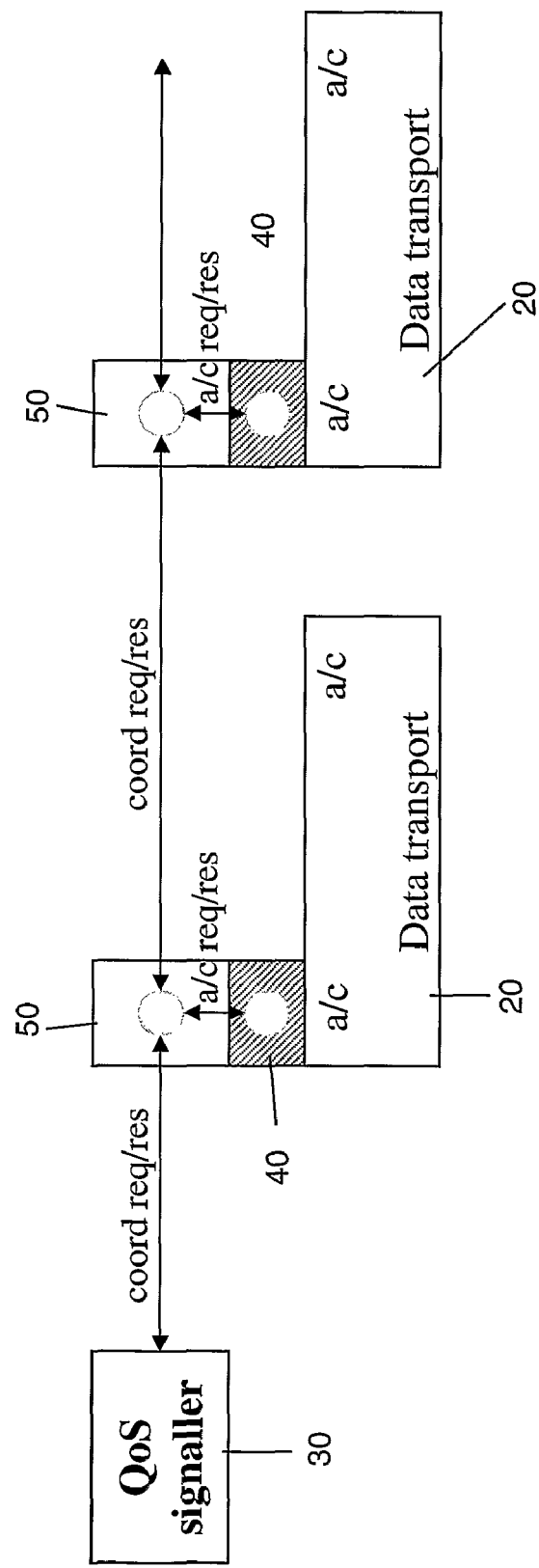
FIG. 2 is a diagram of admission control signalling using a co-ordination layer according to an embodiment of the invention.
Figure 3:
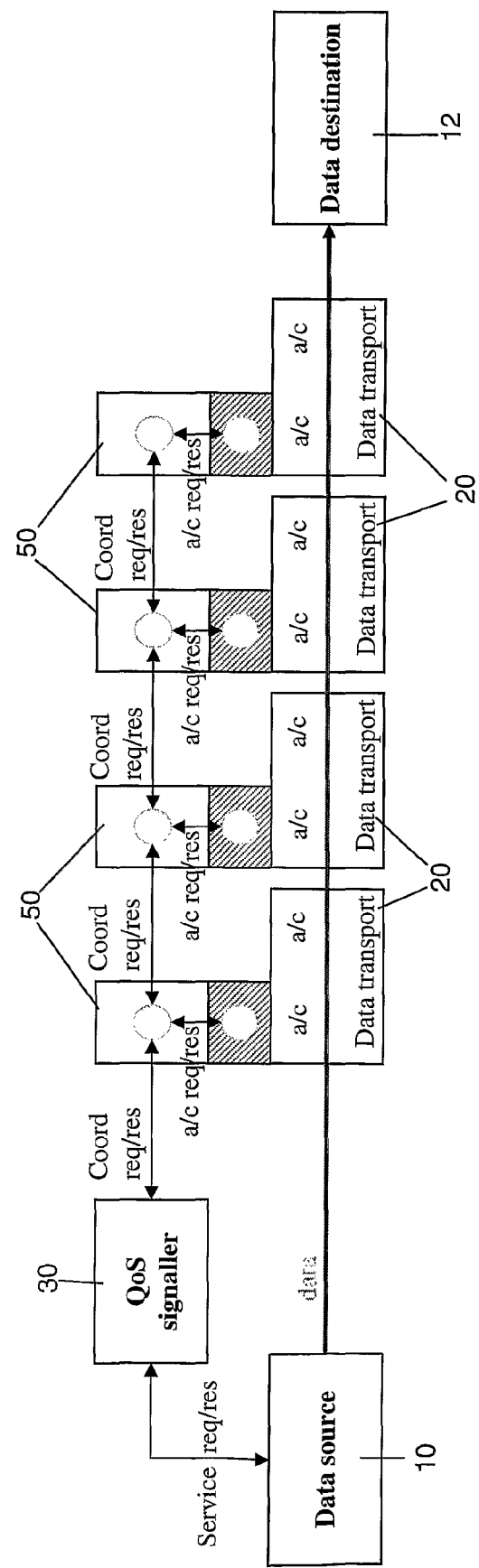
FIG. 3 is a diagram illustrating how the co-ordination layer may extend from end to end in an embodiment of the invention.

FIGS. 2 and 3 illustrate the arrangement of co-ordinator entities with respect to data transport network domains of a first embodiment of the invention. More particularly, FIG. 2 illustrates how a QoS signaller 30, which may be part of a sending application, or may be an independent entity therefrom serving an application, exchanges co-ordination request and response messages with a co-ordinator 50. The co-ordinator 50 sits on top of the admission control interface 40 of a data transport network domain 20, and communicates with the admission control interface 40 by the exchange of admission control request and response messages. The co-ordinator 50 of the first hop transport network domain 20 also exchanges co-ordination request and response messages with a second hop co-ordinator 50, which sits on top of the admission control interface 40 of a second hop data transport network domain 20. FIG. 2 therefore illustrates the main feature of the first embodiment of the present invention, that within the first embodiment a co-ordinator entity 50 is provided for each transport network domain 20, and which sits on top of the admission control interface thereof. The QoS signaller 30 therefore need only communicate with the first hop co-ordinator entity 50, in terms of sending admission control requests thereto and receiving admission control responses therefrom. The co-ordinator entities 50 act, as will be described in detail later, to pass the admission control requests to the admission control interfaces 40 of the respective data transport network domains 20 and to receive admission control response information containing the network reservations made in response to the request within each transport network, and co-ordinate those responses into a single response.

FIG. 3 expands FIG. 2 to provide an end to end view of a data flow, from a data source 10, to a data destination 12, via the plurality of transport network domains 20. Each transport network domain 20 is provided with a respective admission control interface 40, and a respective co-ordinator entity 50. As shown in FIG. 3, a data source 10 makes a service request to a QoS signaller 30, which then encapsulates the service request as admission control request information within a coordination request message, and sends it to the first hop co-ordinator 50. The first hop co-ordinator 50 propagates the admission control request information to the other co-ordinators 50 for each of the data transport networks via co-ordination request messages, and also acts to instigate the admission control procedures for its own data transport network, by forwarding the admission control request information to the admission control interface of the data transfer network in an admission control request message. At each transport network domain 20, the admission control request information is examined and admission control checks performed to determine whether the request can be serviced, and network reservations made in response to the request, as appropriate. In this respect, the admission control request information typically contains a QoS description of the QoS parameters desired by the sending application, which are to be met by the network, if possible. If not possible, either a lower level of QoS will be granted, or no QoS reservation is made at all. Whatever the outcome of the admission control check, the outcome is communicated back to the co-ordinator 50 in the form of an admission control response message containing admission control response information. These steps are performed between the respective co-ordinators and admission control interfaces of each of the data transport networks, and the admission control responses can then be combined at the co-ordination layer by the exchange of co-ordination request and response messages as appropriate. More particularly, there are two modes of operation for the combining of admission control responses, which we refer to herein as "blocking mode" and "non-blocking mode". These are described briefly next, and in more detail later.

More particularly, in "blocking mode" a co-ordinator 50 receives an admission control request in a co-ordination request message, and then acts to determine, if the transport network domain which it serves can grant the admission control request, before the admission control request is forwarded on. Therefore, with reference to FIG. 3, when the first hop co-ordinator 50 receives a co-ordination request message containing an admission control request from the QoS signaller 30, before forwarding the co-ordination request message on to the second hop co-ordinator, it encapsulates the admission control request information in an admission control request message, and transmits the admission control request message to the admission control interface 40 of the data transport network 20. As the admission control request information typically contains a QoS description including various QoS parameters, the admission control interface 40 of the data transport network 20 can determine whether the QoS request can be served, and if so it makes the necessary network reservation. If the request cannot be served, then either a degraded level of QoS, or an error message can be passed back. Whatever the response, the admission control interface 40 formulates an admission control response message with the granted QoS (or otherwise), which is sent from the admission control interface 40 to the co-ordinator 50. The co-ordinator 50 receives the admission control response message with the granted QoS, and, assuming that no error message has been received (in which case the first hop domain is not able to grant the admission control request at all) the first hop co-ordinator 50 acts to combine the admission control response information containing the granted QoS parameters with the original admission control request information into new admission control request information, which is then forwarded to the second hop co-ordinator in a second co-ordination request message.

At the second hop co-ordinator, the same actions are performed, and so on at each hop co-ordinator such that the admission control request information is propagated along the flow path from hop to hop, being modified as appropriate by admission control responses along the way. At the last hop co-ordinator a co-ordination response message containing the aggregated and combined response along the entire path can then be sent back to the QoS signaller 30.

In contrast, within "non-blocking mode", whenever a co-ordinator entity receives a co-ordination request message containing admission control request information, it immediately forwards the request on to the next hop co-ordinator. The admission control request information is then passed to the admission control interface 40 of the particular data transport network 20 which the co-ordinator serves, and an admission control response obtained. Each co-ordinator then waits until it receives a co-ordination response message from a downstream, co-ordinator. That is, except for the last hop co-ordinator, which when it receives its admission control response from its local admission control interface formulates a co-ordination response message to pass on its local admission control response to the previous hop up stream. The previous hop upstream then combines its local admission control response with the received admission control response, into a new admission control response, which it then passes back upstream. In this way, the admission control responses are propagated and combined from co-ordinator to co-ordinator upstream, until the first hop co-ordinator is able to provide to the QoS signaller a single co-ordination response message containing admission control response information which represents the admission control responses from each of the data transport networks.

Further information concerning the operation of the co-ordinators in blocking and non-blocking mode, as well other examples, will be given later.

Figure 4:
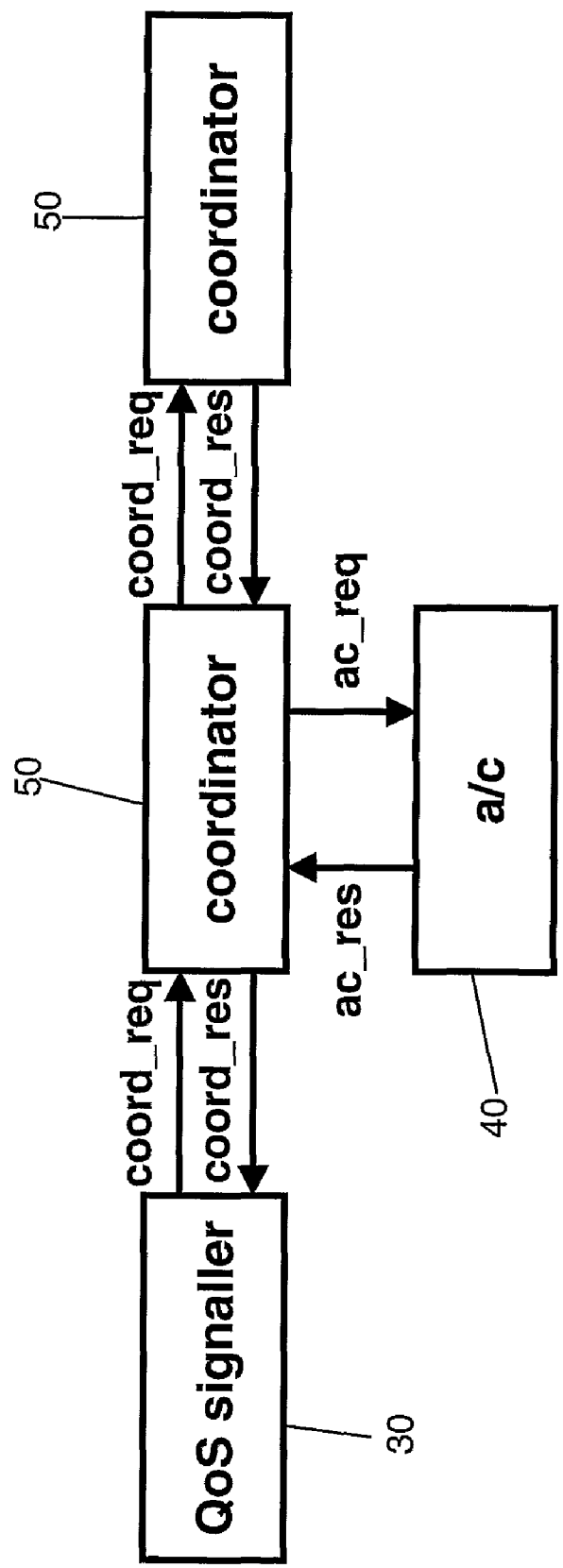
FIG. 4 is a block diagram illustrating the interfaces of a co-ordinator entity used in an embodiment of the invention.

FIG. 4 is a diagram which illustrates the interfaces required of any particular co-ordinator 50. In particular, any particular co-ordinator entity 50 must possess interfaces which exchange co-ordination request and response messages with co-ordinator entities at the same level as itself within the co-ordination layer, such as, as shown in FIG. 4, a QoS signaller 30, and another co-ordinator 50. In addition, a co-ordinator entity must possess additional message interfaces to allow for admission control request and response messages to be exchanged with at least an admission control interface 40 of the transport networks, below the co-ordination layer. Additionally, in other embodiments of the invention to be described later, the same admission control interfaces are used to exchange admission control request and response messages with co-ordinators at lower and higher levels in a hierarchical co-ordination layer.

A more detailed description of the operation of the "blocking mode" variant of the first embodiment will now be described, with respect to FIGS. 11 to 13, and 18 and 19.

Figure 11:
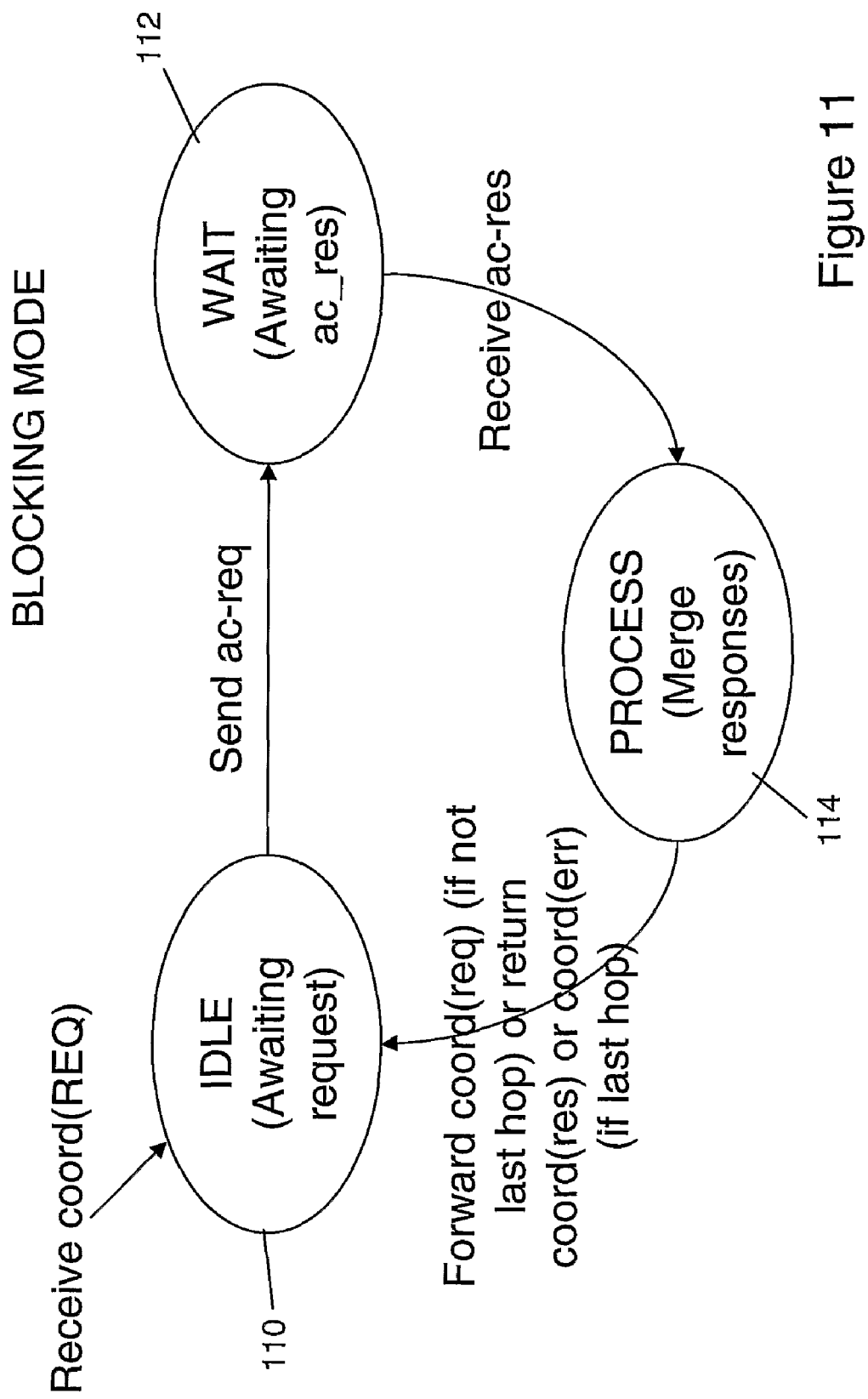
FIG. 11 is a state diagram illustrating the operation of a co-ordinator entity in blocking mode in an embodiment of the invention.

As noted above, in blocking mode the admission control requests are served by the particular transport network domain for which a co-ordinator entity is acting, before the co-ordinator entity forwards on the admission control request to a next hop co-ordinator. FIG. 11 illustrates a state diagram of the operation of a co-ordinator entity acting in "blocking mode".

After power up and initialisation, a co-ordinator entity 50 acting in blocking mode enters an idle state 110 in which it awaits the receipt of a co-ordination request message co-ord (req). A co-ordination request message co-ord (req) may be received from any of a QoS signaller 30 (if the co-ordinator is a first hop co-ordinator for a particular flow) or from another co-ordinator entity 50 in the co-ordination layer. Typically, a co-ordination request message co-ord (req) will be received from a previous hop co-ordinator, for any particular data flow. When a co-ord (req) message is received, the idle state 110 is exited, and the co-ordinator entity 50 sends an admission control request message ac_req to the admission control interface 40 for which it acts. The co-ordinator 50, having sent the admission control request message, then enters a wait state 112, to await the admission control response message from the admission control interface 40.

Figure 19:
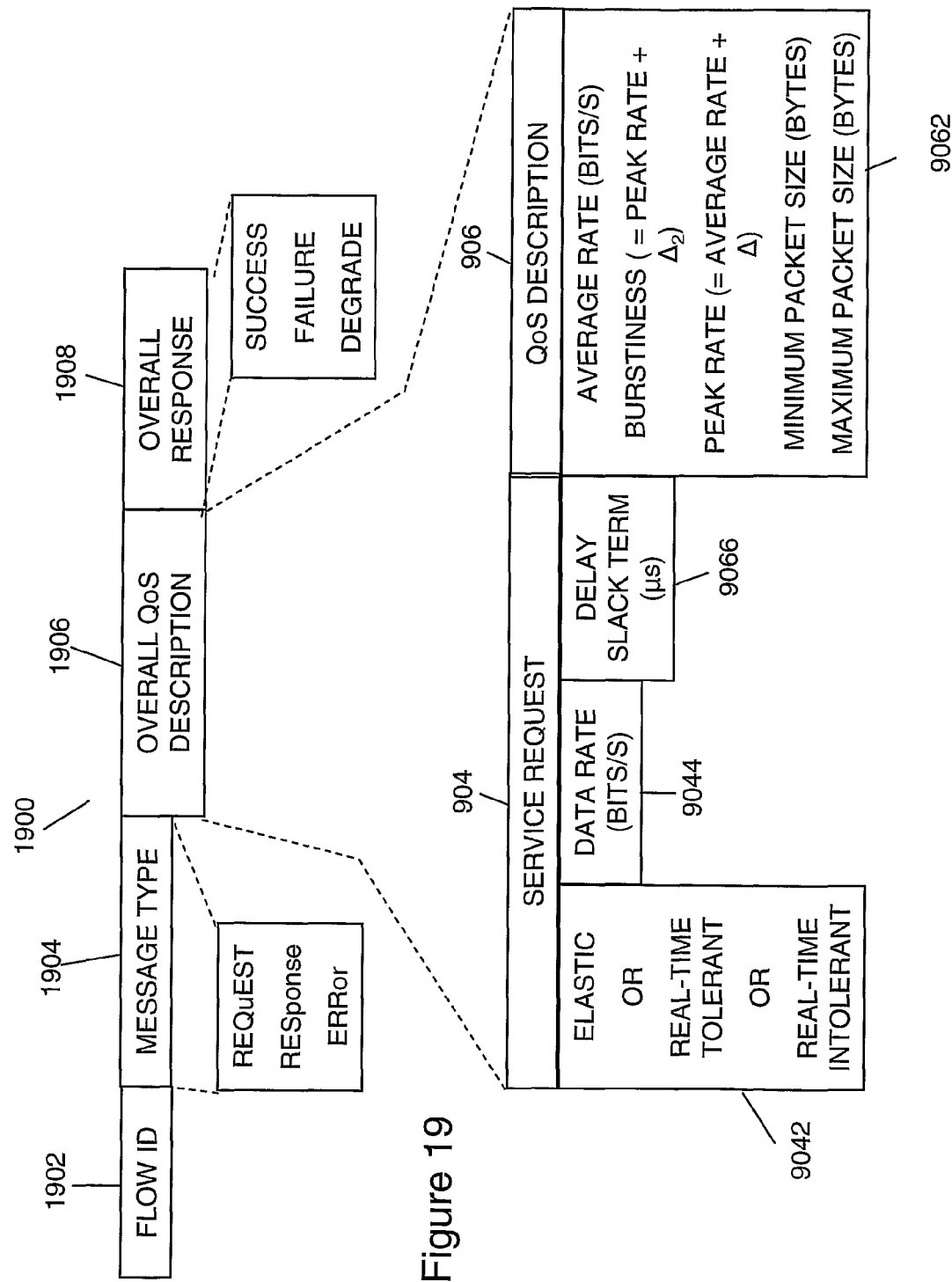
FIG. 19 is a diagram illustrating the format of a co-ordination message within an embodiment of the present invention.

FIG. 19 illustrates the format of a co-ordination message, which may be a co-ordination request or response message, depending on the value of a flag variable is a message type field. In particular, a co-ordination message 1900 comprises a first field 1902 which contains the flow ID of the IP flow for which admission control is being requested by the QoS signaller. A second field is the message type field 1904, which contains a flag indicating whether the co-ordination message is a request message, a response message, or an error message. Following the message type field is an overall QoS description field 1906, which contains a QoS description of values for particular QoS parameters required by the flow having the flow ID. It should be noted that embodiments of the present invention do not specify any particular QoS description format, and any type of QoS description can be included in the overall QoS description field 1906. FIG. 19 illustrates an example of the type of QoS description which may be contained within the overall QoS description field 1906, which is used in further embodiments of the invention to be described later. However, for the purposes of the present embodiment, it should be noted that all that is required of the overall QoS description field 1906 is that it is large enough to be able to carry a QoS description of any desired form, and which is capable of being interpreted by the admission control interfaces 40 of the data transport networks 20.

A fourth field following the overall QoS description field is the "overall response" field 1908, which contains a variable which may take the values success, failure, or degrade. This field is used particularly when the message type is of message type response, to indicate whether the admission control request has met with success, failure, or whether it has been partially successful, in that the granted QoS for any particular flow has been degraded.

When a co-ordinator entity is in state 110 (idle) it may receive a co-ordination request message with the flag "request" in the message type field 1904, and containing a QoS description within the overall QoS description field 1906. The co-ordinator then takes the contents of the overall QoS description field 1906, and encapsulates them within an admission control request message, of the form shown in FIG. 9. Here, the contents of the overall QoS description 1906 have a flow ID field 902 appended to the front thereof, and are then transmitted to the admission control interface 40 of the transport network.

Returning to FIG. 11, having transmitted the admission control request message, as noted above the co-ordinator 50 then waits for the admission control response message. An admission control response message 340 is of the format shown in FIG. 10, and comprises a first field 1002 comprising the flow ID in respect of which the response is being made, as well as a response field 1004, containing a variable which takes the values "success", "failure", or "degrade". An additional field is the granted QoS description field 1006, which contains a QoS description of the transport network reservation which has been made for the flow. The QoS description preferably is in the same format as the QoS description passed to the admission control interface 40 in the admission control request message. Please note that FIGS. 9 and 10 illustrate an example QoS description which may be used with a further embodiment of the present invention, to be described later. In the presently described embodiments, however, no particular type of QoS description is required, and any QoS description which can be understood by the admission control interface can be used.

Figure 12:
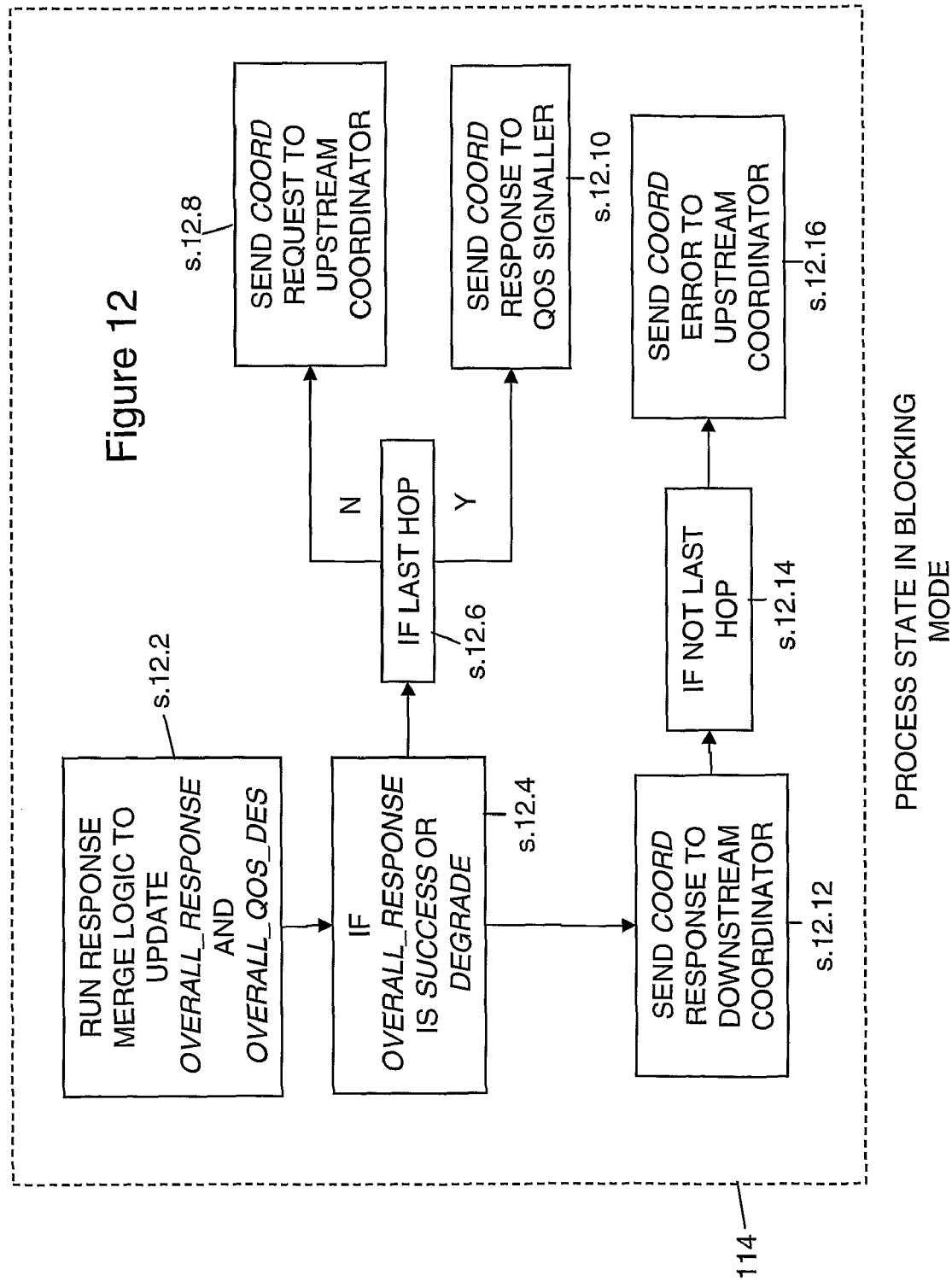
FIG. 12 is a flow diagram illustrating the steps performed in a process state by a co-ordinator entity in an embodiment of the invention.

Returning to FIG. 11, the wait state 112 is exited when an admission control response message is received from the admission control interface 40 which the co-ordinator 50 is serving. The co-ordinator then enters the process state 114, in which the admission control response information is merged with the admission control request information, according to some appropriate merging logic, described later. FIG. 12 illustrates the process steps performed in the process state 114.

Firstly, at step 12.2 the merge logic is run to update the "overall response" variable, included in the overall response field 1908 of a co-ordination response message. Additionally, in the same step the overall QoS description is also updated, for inclusion in the overall QoS description field 1906 of a co-ordination response message. The operation of the merge logic to perform these steps will be described later.

Processing then proceeds to step 12.4, wherein evaluation is performed as to whether the overall response variable takes the value success or degrade. If this is the case, then processing proceeds to step 12.6, wherein a further evaluation is undertaken to determine whether the co-ordinator is a last hop co-ordinator. If this is not the case, then processing proceeds to step 12.8, wherein a co-ordination request message 1900, containing the variable overall response as updated at step 12.2, as well as the overall QoS description as updated in the same step, and having message type "request" is sent at step 12.8. Processing then ends. In contrast, if at step 12.6 it is determined that the co-ordinator is a last hop co-ordinator, then a co-ordination response message having message type "response" and containing the overall QoS description and overall response in fields 1906 and 1908 is sent directly back to the QoS signaller.

In contrast to the above, if at step 12.4 the evaluation is that the overall response is not success or degrade, then it must be that the overall response variable takes the value "failure", in which case processing proceeds to step 12.12, wherein a co-ordination response message containing the overall response variable "failure" in the overall response field is sent to the co-ordinators of the previous hops, and onto the QoS signaller. Moreover, if the present co-ordinator is not the last hop co-ordinator, a co-ordination error message as type "error" is sent to the next hop co-ordinator. In this case, a failure message is obtained if the transport network is not able to grant the admission control request at all.

Figure 18:
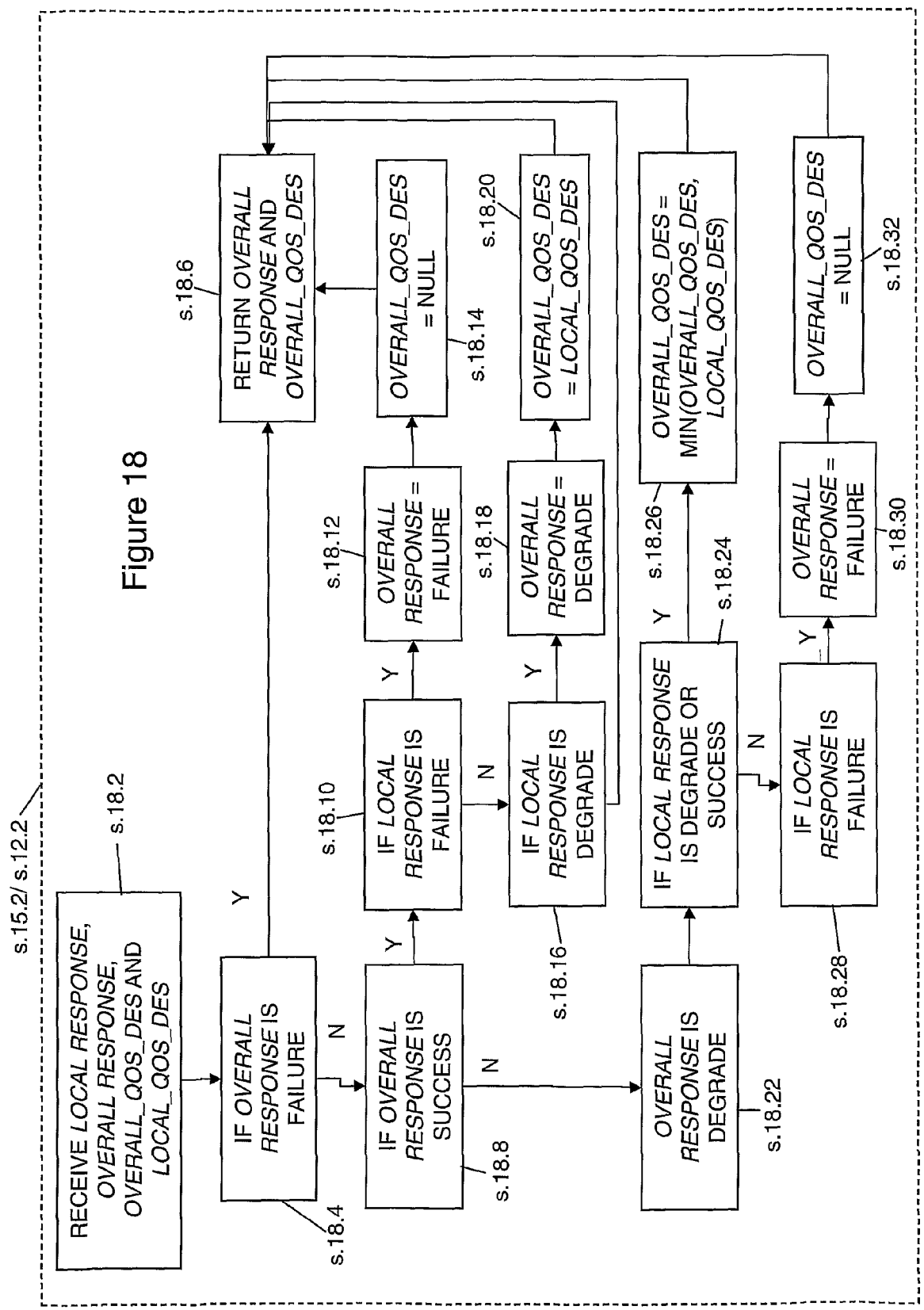
FIG. 18 is a flow diagram illustrating steps performed at a co-ordinator entity in an embodiment of the present invention.

FIG. 18 illustrates the operation of the merging logic performed in step 12.2.

Here, at step 18.2 the merging logic receives the variables local_response, overall_response, overall_QoS_DES and local_QoS_DES. In this respect, the variable local_response is the value taken from the response field 1004 of the admission control response message 340, and can take the values success, failure, or degrade. In particular, the value "success" is sent when the admission control interface has been able to grant the requested QoS completely, the value "failure" is sent when no admission control reservation is able to be made, and the response value "degrade" is sent when the admission control interface 40 has been able to grant, at least partially, or as near as possible, the admission control request.

The variable "overall response" is taken from the overall response field 1908 of the co-ordination request message, and takes the value success, failure, or degrade. Here, again, the value "success" is sent when previous co-ordinators have been able to meet the requested QoS completely. The variable "degrade" is received when the requested QoS has been partially met by previous hop domains, or a reservation which is as close as possible to the requested QoS has been made. The variable "failure" is received as the overall response when a previous hop domain has not been able to make the requested reservation.

The variable overall_QoS_DES is the QoS description taken from the overall QoS description field 1906 in the co-ordination request message received at the co-ordinator. Similarly, the variable local_QoS_DES is the QoS description received back from the admission control interface 40 in the granted QoS description field 1006 of the admission control request message 340. Having received all of these variables, the merged logic function can then operate, as follows.

Firstly, at step 18.4 an evaluation is performed to determine whether the overall_response variable takes the value failure. If this is the case, then there is no point in performing the rest of the merging function, and processing proceeds to step 18.6, wherein the existing overall response (i.e. failure) as well as the existing overall QoS description (which most likely takes a nil value, due to the previous failure) are returned. Processing of the merging logic function then ends.

In contrast, if at step 18.4 the overall response is not determined to be failure, then an evaluation is undertaken at step 18.8 to determine whether the overall response variable takes the value success. If this is the case, then processing proceeds to step 18.10, wherein an evaluation is undertaken to determine whether the local response variable is failure. If this is the case, i.e. that although previous hop domains have been able to grant the request, the present domain has not been able to grant the admission control request, then at step 18.12 the overall response variable is set to failure, and then at step 18.14 the overall QoS description is made equal to nil. Processing then proceeds to step 18.6, wherein the updated overall response and overall QoS descriptions are returned.

Returning to step 18.10, if this evaluation proves negative i.e. the local response is not failure, then processing proceeds to step 18.16, in which case an evaluation is performed as to whether the local response is degrade. If this is the case, then at the present time the overall response i.e. the response from previous domains has been success, but the local response is that the granted QoS needs to be degraded for the local domain, and hence the overall response should also be set to degrade. This is performed at step 18.18, and further at step 18.20 the overall QoS description is made equal to the local QoS description. Processing then proceeds to step 18.6 wherein the updated overall response and overall QoS description values are returned.

In contrast at step 18.16, if the evaluation of whether the local response is degrade returns negative, then that must mean that the local response is success, and that the admission control request can be properly served, with the requested QoS. In this case, since the overall response was already success, if the local response is success, then neither the overall response nor the overall QoS description variables need to be changed, and can thus be returned in their existing form at step 18.6.

Returning to step 18.8, if the evaluation that the overall response is success returns negative, then processing proceeds to step 18.22. Here, the overall response must equal degrade, given the previous evaluations of step 18.4 and 18.8. Processing then proceeds to step 18.24 wherein an evaluation is performed as to whether the local response is degrade or success. If this is the case, then processing proceeds to step 18.26, wherein the overall QoS description is set to be equal to the minimum of the existing overall QoS description, or the local QoS description. In this respect, previous domains have already degraded the granted QoS from that originally requested, and hence this function looks to see whether the local admission control interface has further degraded the QoS that it is able to grant the flow. For example, the local admission control interface may be able to match the overall QoS description in terms of average rate, but may offer a lower peak rate than has already been granted previously. If this is the case, then the minimum QoS description will be the local QoS description.

In this respect, there is clearly room for much design change in how the overall QoS description is compared with the local QoS description to determine which is the minimum. For example, it may be that a very straightforward minimum function merely looks at one of the QoS parameters such as average rate, or peak rate, and determines which of the local QoS description or overall QoS description has the minimum of that parameter. A more complicated minimum function may look at a subset of the QoS parameters, for example average rate and peak rate, and combine the respective differences between the parameters of the two QoS descriptions to determine the minimum. An even more complicated minimum function may weight various of the QoS parameters with more importance with respect to the others when combining the differences. For example, with such a weighting technique a smaller difference in average rate than in peak rate may be weighted (for example by multiplying by a factor) so as to be more significant in comparing in the overall difference to determine the minimum.

In contrast, another even more sophisticated minimum function may, for example, take a Euclidean distance between the respective QoS descriptions. In this latter respect, for example, the various QoS parameters of each description may be squared and then summed, and then have the square roots taken of the sum, with the ultimate value of each then being compared to determine which is the minimum. In a variant, weighting factors may also be applied to the QoS parameters, prior to or after the squaring operation.

Several mechanisms for determining the minimum of two QoS descriptions are therefore apparent, and various other mechanisms to determine which in fact of two QoS descriptions represents the minimum thereof will be apparent to the person skilled in the art, and which may be used in embodiments and are intended to be encompassed by the present invention.

Howsoever the minimum is determined, at step 18.26 the overall_QoS_DES variable is set equal to the minimum of the existing overall_QoS_DES variable and the local_QoS_DES variable, and then at step 18.6 the updated overall response, and overall_QoS_DES variable is returned.

Returning to step 18.24, if the evaluation of the local response is such that it is not degrade or success, then processing proceeds to step 18.28, wherein the local response variable must take the value failure. That is, although previous hop domains have been able to grant the admission control request albeit with a degraded QoS, the local domain is not able to grant the request. In this case, at step 18.30 the overall response variable is set equal to failure, and the overall QoS DES variable is set equal to nil, at step 18.32. Processing then proceeds to step 18.6, wherein the updated overall response and overall QoS DES variables are returned. The returned values are then used in the flow diagram of FIG. 12, as described previously.

Returning to FIG. 11, having performed the processes at state 114, and sent the co-ordination request, response, or error messages as appropriate, the co-ordinator returns to the idle state 110. The co-ordinator then waits for receipt of a future co-ordination request message, in respect of a different flow. The operation of the co-ordinator in respect of the originally received co-ordination request message is then concluded.

Figure 13:
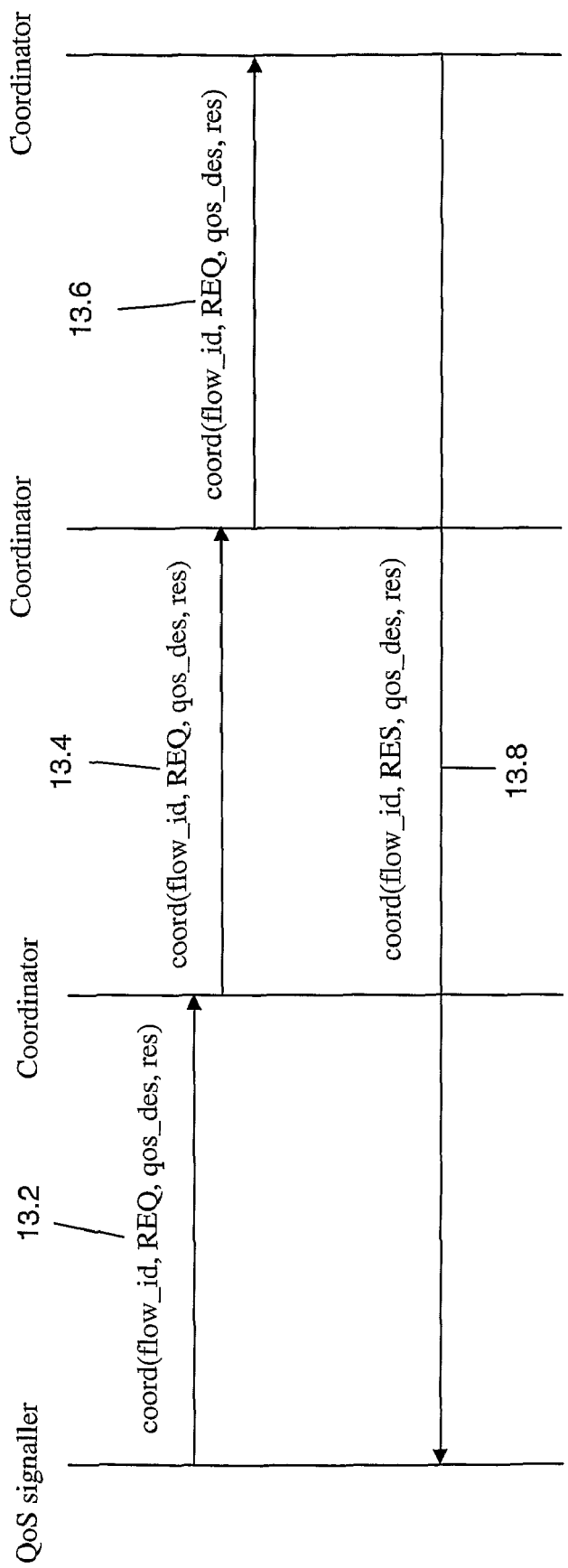
FIG. 13 is a diagram illustrating a message exchange in an embodiment of the present invention.

Each of the co-ordinators 50 on a flow path operate in accordance with the above described description, when operating in blocking mode. FIG. 13 gives an example of message flows between a QoS signaller and various co-ordinators along a path. In particular, a QoS signaller first sends a co-ordination request message 13.2 containing a flow ID, a co-ordination message type (being request) a QoS description, and a response term (which takes a nil value at present) to a first hop co-ordinator. The first hop co-ordinator then performs the actions outlined above, and if successful (in this respect if the response is "success" or "degrade") the first hop co-ordinator sends a further co-ordination request message 13.4 containing the flow ID, the message type request, the updated QoS description, as well as the updated response to the second hop co-ordinator. The second hop co-ordinator then performs the steps outlined above, and if successful forwards on the admission control request in the form of a third co-ordination request message 13.6, containing the flow ID, the request message type flag, the further updated QoS description, as well as the response. This third co-ordination request message is then received at the last hop co-ordinator. The last hop co-ordinator then performs the steps noted above, but because it is the last hop co-ordinator and is not required to forward the co-ordination request message on any further, it instead formulates a co-ordination response message 13.8 containing the flow ID, the message type response, and the updated QoS description and response, which is then sent back to the QoS signaller. Thus, the QoS signaller sends a single co-ordination request message 13.2, and receives a single co-ordination response message 13.8 back from the co-ordination layer, and which indicates to the QoS signaller whether its admission control request has been served, and the QoS parameters which have been granted.

Figure 14:
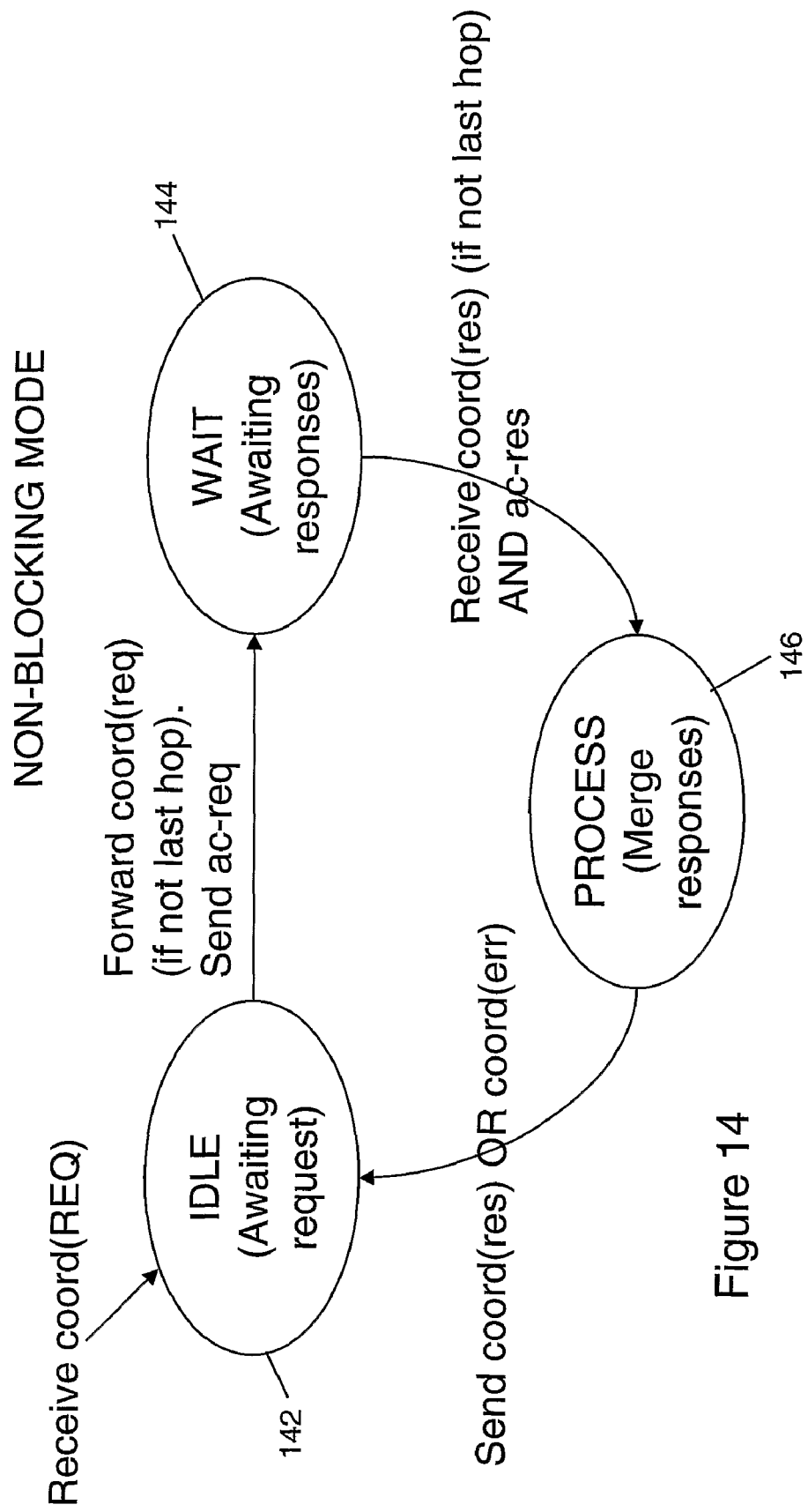
FIG. 14 is a state diagram illustrating the operation of a co-ordinator entity in a non-blocking mode of an embodiment of the present invention.

The operation of the first embodiment using the "non-blocking mode" variant will now be further described. FIG. 14 is a state diagram illustrating the operation of the co-ordinator 50 operating in the non-blocking mode. It will be recalled that in the non-blocking mode an admission control request is forwarded to the next hop co-ordinator before being served by the admission control interface of the local transport network.

With reference to FIG. 14, a co-ordinator in non-blocking mode, after power up and initialisation enters an idle state 142, in which it waits for the receipt of co-ordination request messages. The co-ordination messages are in exactly the same format as described previously for blocking mode, and as shown in FIG. 19. When a co-ordination request message is received at step 142, the co-ordinator 50 acting in non-blocking mode immediately forwards the co-ordination request message on to the next hop co-ordinator, and also sends an admission control request message to the local admission control interface 40. In this respect, the admission control request message is also in the same format as used in blocking mode, and as shown previously in FIG. 9. The co-ordinator then enters a wait state 144 where it awaits an admission control response message from its focal transport network, as well as fall a co-ordination response message from the next hop co-ordinator.

The wait state 144 awaits the receipt of both the local admission control response message, as well as the co-ordination response message from the next hop co-ordinator. The reason for this is that in non-blocking mode the co-ordinator must combine both the local admission control response with the overall response and overall QoS description received from the next hop co-ordinator in a co-ordination response message. This is because, in "non-blocking mode" the aggregation and combination of admission control responses takes place in the opposite direction than in blocking mode, as described previously. Of course, if the co-ordinator is a last hop co-ordinator, then there is no need for it to wait at state 144 for the receipt of a co-ordination response message from a next hop co-ordinator, as there is no next hop co-ordinator. In this case, the wait state can be exited as soon as the local admission control response message is received.

Figure 15:
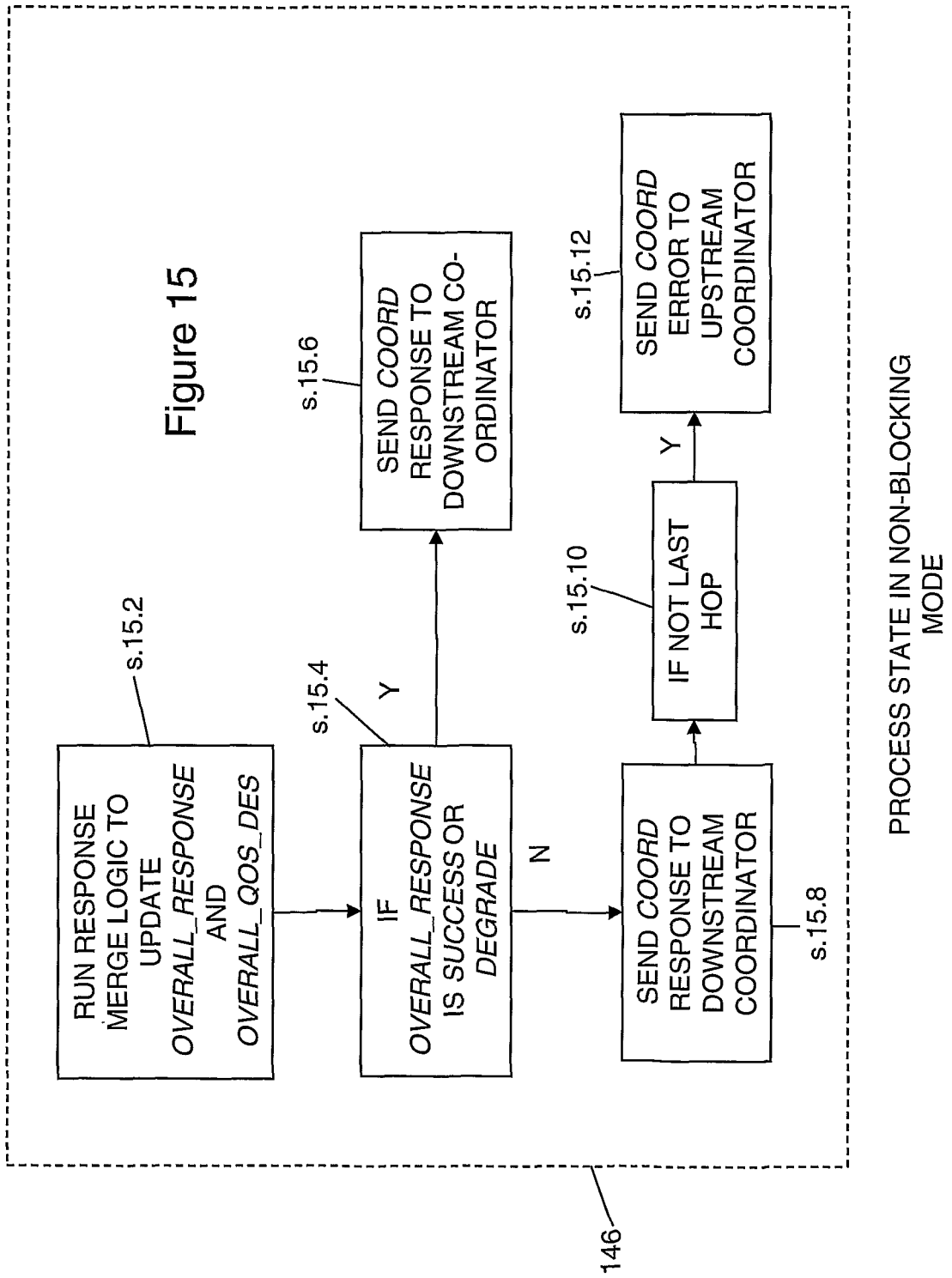
FIG. 15 is a flow diagram illustrating the operation of a co-ordinator entity in the process state of non-blocking mode in an embodiment of the invention.

When the necessary messages have been received, the co-ordinator enters the process state 146, shown in more detail in FIG. 15.

With respect to FIG. 15, within the process state at step 15.2 the response merge logic is run, to update the overall_response variable, and the overall_QoS_description variables. The response merge logic is identical to that used in the blocking mode described previously with respect to FIG. 18. However, here the overall response variable, and the overall_QoS_description variables are those received in the co-ordination response message from the next hop co-ordinator. Apart from this difference, however, the merge logic is identical to that described previously, and returns an updated overall response variable, and overall_QoS_description variable, in the same manner as described previously for blocking mode.

Returning to FIG. 15, at step 15.4 after running the response merge logic, the updated overall_response variable is checked to determine whether or not it takes the values success or degrade. If this is the case, then processing proceeds to step 15.6, wherein a co-ordination response message in the same format as shown in FIG. 19 described previously, and containing the updated overall response variable and overall_QoS_description variables within the overall response field 1908 and overall QoS description field 1906, is sent to the previous hop co-ordinator. Processing then ends.

In contrast, if at step 15.4 it is determined that the overall_response variable is not success or degrade, then it must be that the overall_response variable is failure, in which case processing proceeds to step 15.8, wherein a co-ordination response message is sent to the previous hop co-ordinator, but containing the value failure in the overall response field 1908. A nil value may be contained in the overall QoS description field 1906.

Further, at step 15.10 an evaluation is determined whether the co-ordinator is a last hop co-ordinator, and if it is not, then a co-ordination error message is sent to the next hop coordinator, to inform it of the error. This co-ordination error message should be propagated back along the flow direction towards the last hop co-ordinator.

Having sent the necessary co-ordination response or error messages during state 146, a co-ordinator acting in the non-blocking mode then returns to the idle state 142, as shown in FIG. 14. The idle state 142 is then maintained until a new co-ordination request message is received, for another flow.

Figure 16:
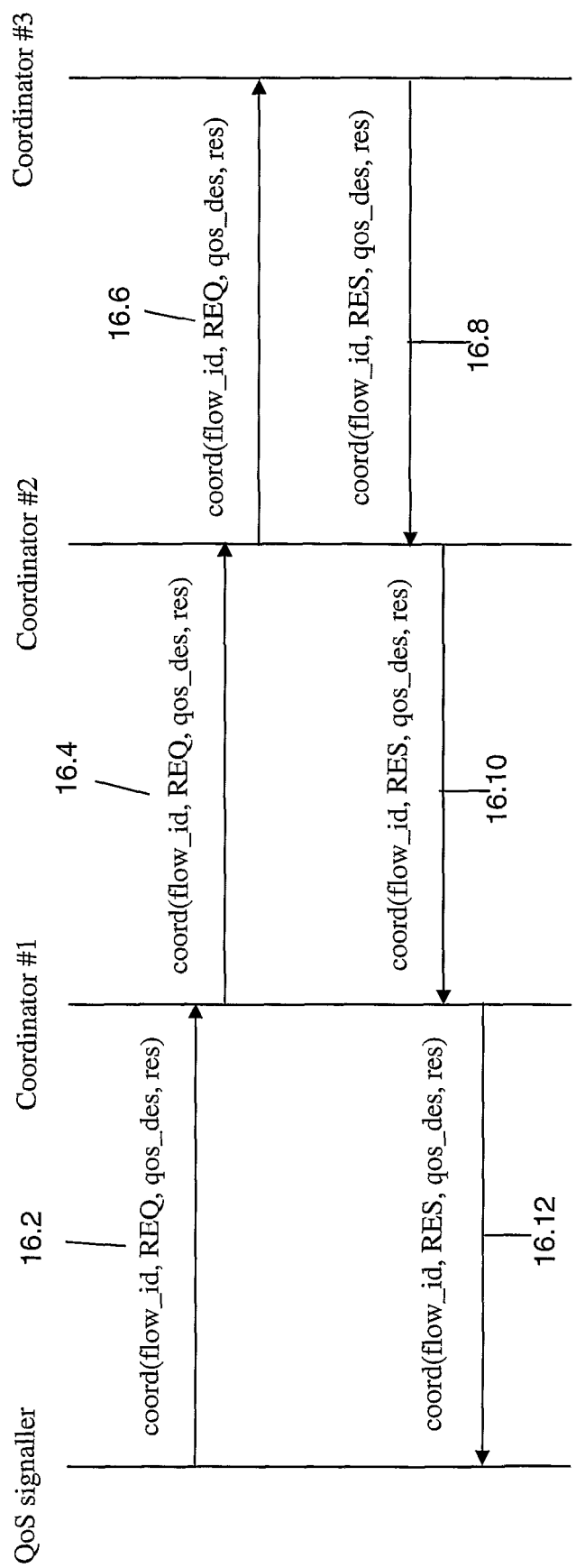
FIG. 16 is a diagram illustrating a message exchange of an embodiment of the invention.

FIG. 16 illustrates an example of the message flows in non-blocking mode, when no error occurs. In particular, a first co-ordination request message 16.2 is sent from the QoS signaller to the first hop co-ordinator, containing the flow ID, and the requested QoS description. The first hop co-ordinator then immediately forwards the admission control request onwards in a second co-ordination request message 16.4, to the second hop co-ordinator. Again the flow ID is included, the message type, the requested QoS description, and the result (which may take a nil value). At the same time, the first hop co-ordinator forwards the flow ID and QoS description to its local admission control interface as an admission control request message, and then awaits both the admission control response message, as well as the receipt of a co-ordination response message, from the next hop co-ordinator. At the second hop co-ordinator, the received co-ordination request message is immediately forwarded to the last hop co-ordinator, as a third co-ordination request message 16.6. Again, the flow ID is included, the message type, the requested QoS description, and the result. The second hop co-ordinator also forwards the flow ID and QoS description to its local admission control interface in the form of an admission control request message, and then awaits the local admission control response message, as well as a co-ordination response message from the last hop co-ordinator. At the last hop co-ordinator the third co-ordination request message 16.6 is received, but is not forwarded on. However, the flow ID and QoS description is passed to its local admission control interface as an admission control request message, and the co-ordinator then waits for its local admission control response message.

When the last hop co-ordinator receives the admission control response message, it encapsulates the flow ID and the granted QoS description in a co-ordination response message, which it then sends as a first co-ordination response message 16.8 to the second hop co-ordinator. When the second hop co-ordinator receives the first co-ordination response message it checks to determine whether it has received its local admission control response message, and if not it waits until this message is received. Once both the co-ordination response message and the local admission control response message have been received, it performs the actions noted earlier in the process state 146 and forwards a second co-ordination response message 16.10 to the first hop co-ordinator. The second co-ordination response message contains the flow ID, and the updated QoS description and co-ordination result. This second co-ordination response message is then received at the first hop co-ordinator, which checks as to whether it has received its local admission control response message. If not, it waits until the local admission control response message is received. Once both the co-ordination response message and the local admission control response message have been received at the first hop co-ordinator, the first hop co-ordinator performs the merging functions described previously with respect to state 146, and then generates a third co-ordination response message 16.12, containing the flow ID, and the updated overall QoS description and overall result. This third co-ordination response message is then passed back to the QoS signaller 30. Thus, with the "non-blocking mode", as with "blocking mode", the QoS signaller 30 is able to transmit a single co-ordination request message containing an admission control request to the first hop co-ordinator, and then receives back a single co-ordination response message from the first hop co-ordinator, but which message contains a combined response which aggregates all of the admission control responses across the multiple domains. Moreover, this is achieved without being tied to any particular QoS description, and hence can be applied across different types of QoS architecture.

Figure 17:
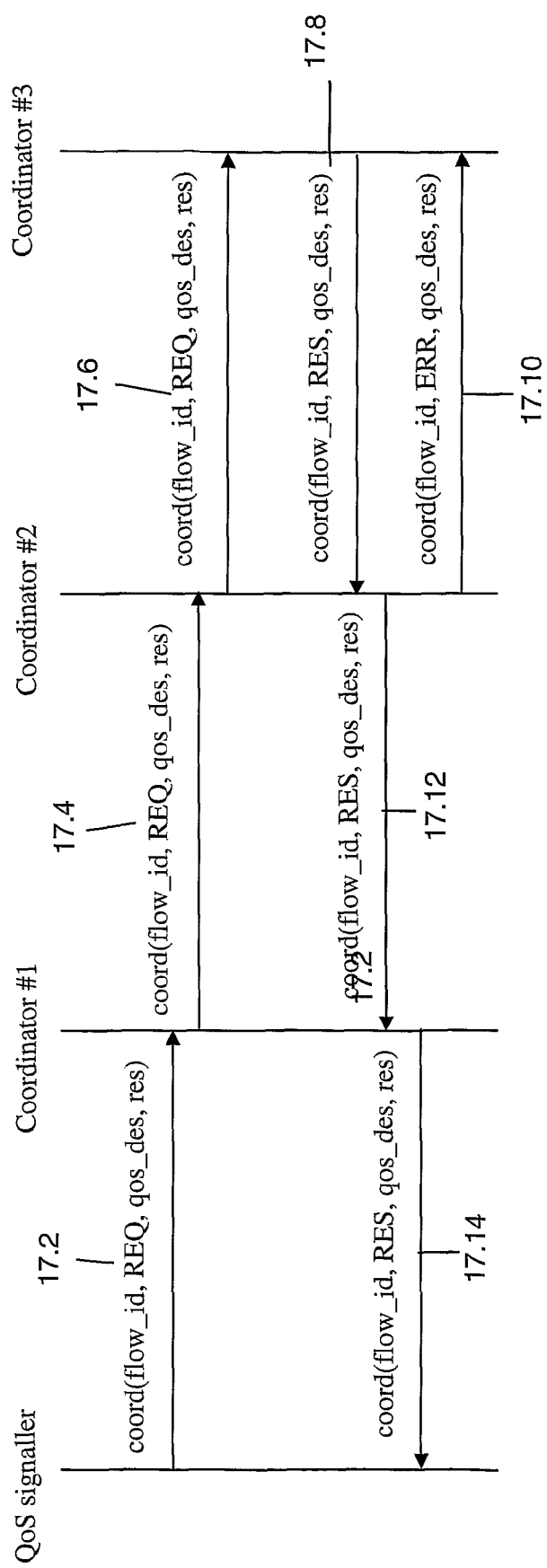
FIG. 17 is a diagram illustrating a message exchange within an embodiment of the invention.

For completeness, FIG. 17 illustrates the case where an error occurs, in that the second hop domain is not able grant the admission control request, or some other error occurs thereat. Here, co-ordination request messages 17.2, 17.4, and 17.6 are propagated through the co-ordination layer in the same manner as described previously in respect of FIG. 16. At each co-ordinator, whenever a co-ordination request message is received, an admission control message is sent to its local admission control interface. In the example of FIG. 17, however, although the last hop co-ordinator is able to grant the request and send the co-ordination response message, at the second hop co-ordinator the admission control request cannot be served, or some other error has occurred. In this case the response is set to failure, and the overall QoS description set to nil. The co-ordination response messages 17.12 containing the failure response, and the nil QoS description is then sent to the first hop co-ordinator, and propagated back to the QoS signaller, as messages 17.12 and 17.14. In order to inform the last hop co-ordinator of the error such that it may cancel its reservation, a co-ordination error message of type error is sent back in the direction of the flow to the last hop co-ordinator, as message 17.10.

Thus, with either the blocking or non-blocking variants of the first embodiment of the invention, a co-ordination layer is provided which sits on top of the admission control interfaces of multiple network domains and acts to co-ordinate the admission control decisions of the multiple domains, such that a QoS signaller can make a single admission control request, and receive a single admission control response. The problem of a QoS signaller therefore having to communicate with multiple admission control interfaces is therefore alleviated, and end to end QoS across multiple domains can be provided.

The above described embodiment envisages the co-ordination layer comprising the co-ordinators 50 sitting on top of the transport network admission control interfaces such that all of the co-ordinators 50 can be considered to be at the same level. Such a view is a transport network centric view of how admission control co-ordination can be performed, which requires co-ordinators to know addressing and routing information to next hop co-ordinators even if the next hop co-ordinator belongs to a transport network which may be in a different country, or owned by a different company. That is, the above described first embodiment takes no account of ownership or organisation of transport networks into "administrative domains", such as for example, by geographical location, ownership, or the like. For example, in reality any particular transport network is owned by an operating company such as, for example, the present applicant. The operating company may in fact own a collection of transport networks of various types, for example a local access network such as a DSL network, or a core network, such as an MPLS network. Moreover, any particular operating company may have different types of network serving different geographical regions dependent on the history of network deployment by the operating company. In practice, therefore, any single IP flow may have to traverse many different transport networks of different types, which are administratively organised by a plurality of administrative entities.

An example of the above is shown in FIGS. 21 and 23, wherein in order for an IP flow to pass from a sending application 2101 to a receiving application 2102, it must traverse multiple transport networks TN1 2114, TN2 2116, and TN3 2124, TN4 2126, TN5 2134, and TN6 2136. However, these transport networks are themselves administratively arranged into administrative domains with transport networks TN1 and TN2 being within the BT administrative domain 2110, transport networks TN3 and TN4 being within the FT administrative domain 2120, and transport networks TN5 and TN6 being within the DT administrative domain 2130. Whilst within any particular administrative domain comprising a collection of transport networks it will be relatively straightforward to allow a co-ordinator entity to know the addresses of other co-ordinator entities in the same domain, it is more problematic for a co-ordinator entity within one administrative domain to learn the address of co-ordinator entities within other administrative domains. Therefore, in order to address this problem within a second embodiment of the present invention we introduce the concept of the co-ordination layer comprising a hierarchical arrangement of co-ordinator entities, arranged by administrative domain. Such a hierarchical arrangement allows co-ordinator entities at the same level (e.g. sat on top of admission control interfaces) to co-ordinate admission control requests and responses with each other within the same administrative domain, and then to provide an admission control response to an administrative domain level co-ordinator. The administrative domain level co-ordinator then co-ordinates its admission control response with other administrative domain level co-ordinators, to produce a single admission control response across all of the administrative domains and lower level transport networks. An example of such a hierarchical arrangement is shown in FIG. 20.

Figure 20:
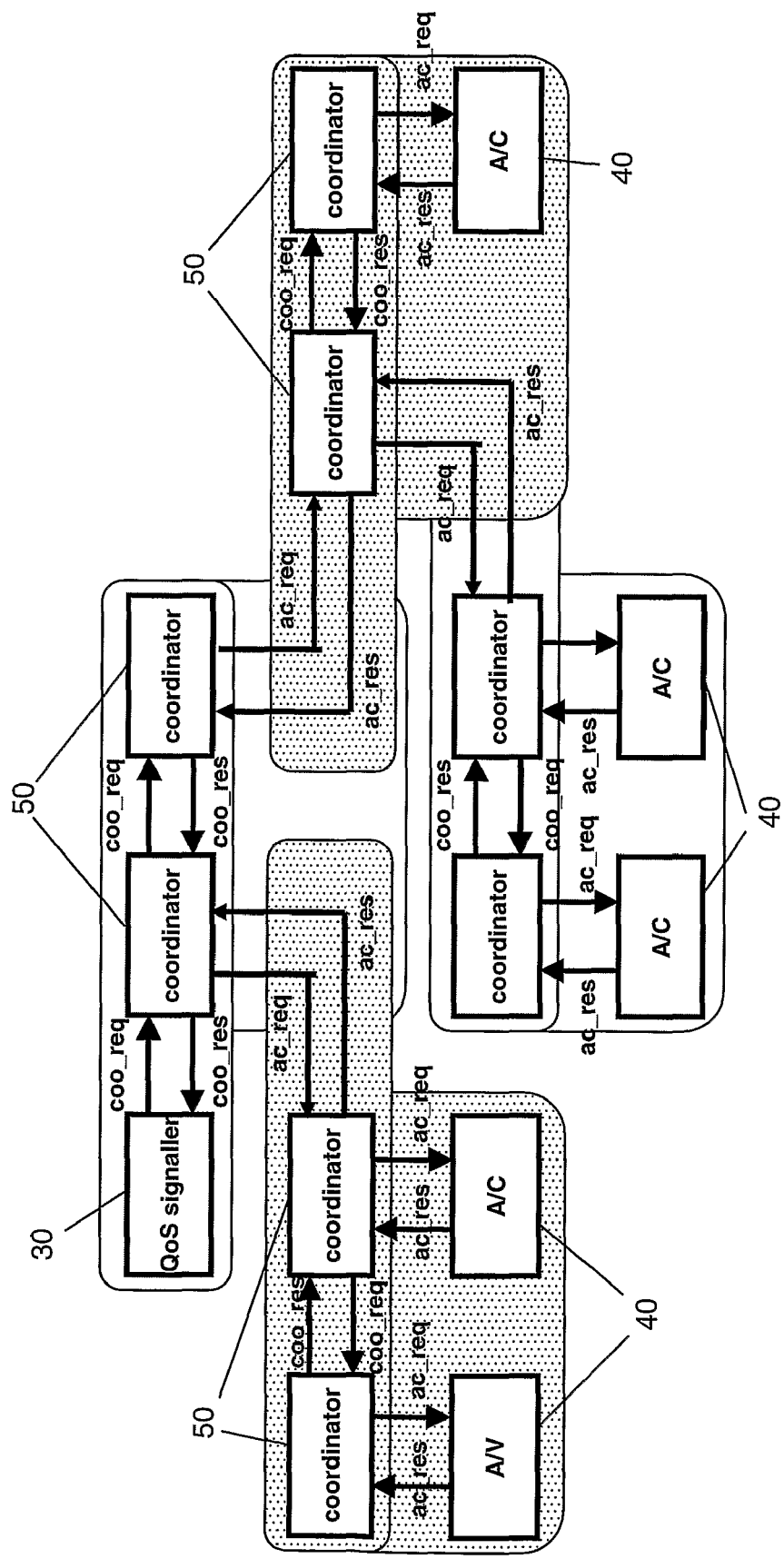
FIG. 20 is a block diagram illustrating a hierarchical arrangement of co-ordinating entities in an embodiment of the invention.

From FIG. 20 it will be seen that for every admission control interface 40 a co-ordinator 50 is provided on top of the admission control interface, as described previously in the first embodiment. These co-ordinator entities operate in exactly the same manner as the co-ordinator entities of the first embodiment, and have the same admission control request and response message interfaces, and co-ordination request and response message interfaces. However, in order to permit for co-ordination across multiple levels of the hierarchy, an additional interface is provided for some of the co-ordinators, in the form of an additional admission request and response message interface to receive admission control request and response messages from a co-ordinator in the next level up in the administrative hierarchy. FIG. 20 in fact illustrates three levels of hierarchy, but with co-ordinators which are essentially identical, and with the same interfaces as described previously being used to accept a single co-ordination request message with an admission control request from the QoS signaller 30 and to provide a single co-ordination response message with the admission control response back thereto. One of the main features of the hierarchical arrangement is that co-ordination request and response messages are used to communicate between co-ordinators at the same level in the hierarchy, whereas admission control request and response messages are used for lowest level co-ordinators to communicate with admission control interfaces of transport networks, and also for communications between co-ordinators of different layers in the hierarchy. However, the formats of the co-ordination request and response messages, as well as the admission control request and response messages are the same as described previously in respect of the first embodiment, and moreover the operations on receipt of such messages are also the same. Additionally such a hierarchical arrangement may also operate in either "blocking mode" or "non-blocking mode" or "non-blocking mode", as will be apparent from the following examples.

Turning to FIGS. 21 and 22, as described previously FIG. 21 illustrates a collection of, transport networks which an IP flow must traverse, and which are arranged into three administrative domains. Each transport network has an admission control interface (not shown), on top of which is sat a co-ordinator. Thus, for example, transport network TN1 is provided with co-ordinator 2112, whereas transport network TN2 is provided with co-ordinator 2118. Transport network TN3 is provided with co-ordinator 2122, and transport network TN4 is provided with co-ordinator 2128. Transport network TN5 is provided with co-ordinator 2132, and transport network TN6 is provided with co-ordinator 2138. The co-ordinators 2112, 2118, 2122, 2128, 2132, and 2138 exchange admission control request and response messages with the respective admission control interfaces of transport networks TN1, TN2, TN3, TN4, TN5, and TN6.

Additionally provided for each administrative domain is an additional co-ordinator. Thus, the BT domain 2110 is provided with co-ordinator 2111, the FT domain 2120 is provided with co-ordinator 2121, and the DT domain is provided with co-ordinator 2131. Each of these co-ordinators communicate via admission control request and response messages with the first hop transport network level co-ordinators in their administrative domains. Thus, for example, co-ordinator 2111 communicates with co-ordinator 2112, co-ordinator 2121 communicates with co-ordinator 2122, and co-ordinator 2131 communicates with co-ordinator 2132. Moreover, the administrative domain level co-ordinators communicate with each other, as well as with the QoS signallers of the sending and receiving applications 2101 and 2102, via co-ordination request and response messages, in the format discussed previously in the previous embodiment. With such an arrangement of co-ordinators and using the admission control request and response messages, and co-ordination request and response messages discussed previously, a hierarchical co-ordination layer is obtained, which can operate in either of the "blocking mode", or "non-blocking mode", described in respect of the first embodiment. Examples of the operation of such a hierarchical arrangement in "blocking mode" and "non-blocking mode" are given below.

FIG. 22 illustrates the sequence of message exchanges between the various co-ordinators in "blocking mode". Please note that FIG. 22 does not illustrate the exchange of admission control request and response messages between the transport network level co-ordinators and the respective admission control interfaces, but that such messages will take place, as will be apparent from the following.

Assume that a QoS signaller of application 2101 is to set up admission control reservations for an IP flow. The first step is for the QoS signaller to send a co-ordination request message containing admission control request information including a QoS description to the first hop administrative co-ordinator 2111, belonging to the first hop administrative domain 2110. The first hop administrative co-ordinator 2111 receives the co-ordination request message, and then forwards the admission control request information including the QoS description to the first hop transport network co-ordinator 2112 as an admission control request message. In blocking mode the first hop transport network co-ordinator 2112 formulates its own admission control request message which it sends to the admission control interface of transport network TN1, and then receives the admission control response message from the transport network interface in the manner described previously in respect of the first embodiment. The co-ordinator 2112 then merges the admission control response information with the admission control request information, and forwards the admission control request information as a co-ordination request message 3 to the second hop transport network co-ordinator 2118. The second hop transport network co-ordinator 2118 then undertakes the admission control request and response message exchange with the admission control interface of transport network TN2, merges the admission control response information, and sends a co-ordination response message 4 back to co-ordinator 2112. Co-ordinator 2112 then encapsulates the admission control response information comprising the present overall response, and overall QoS description into an admission control response message, which it then forwards as admission control response message 5 to first hop administrative co-ordinator 2111. With the transport network reservations for the flow then made for transport networks TN1 and TN2 within administrative domain BT, administrative domain co-ordinator 2111 forwards the admission control request information in the form of the overall QoS description and QoS response to the second hop administrative domain co-ordinator 2121, belonging to administrative domain FT.

The second hop administrative domain co-ordinator 2121 then essentially performs the same actions as the first hop administrative domain co-ordinator 2111. In particular, it forwards the admission control request information in an admission control request message to the second administrative domain first hop transport network co-ordinator 2122, which encapsulates the admission control request information in its own admission control request message to the admission control interface of transport network TN3. Transport network TN3 responds with an admission control response message containing its admission control response information, and co-ordinator 2122 merges the response information with the request information, and then forwards the updated admission control request information to co-ordinator 2128 of transport network TN4 in a co-ordination request message. Co-ordinator 2128 then undergoes its own admission control request and response message exchange with the admission control interface of transport network TN4, merges the responses, and sends a co-ordination response message including the updated QoS description and response to co-ordinator 2122. Co-ordinator 2122 then responds with an admission control response message 10 to the second hop administrative domain co-ordinator 2121.

Second hop administrative domain co-ordinator 2121 then forwards the updated admission control request information as a co-ordination request message 11 to third hop administrative domain co-ordinator 2131. Third hop administrative domain co-ordinator 2131 forwards the admission control request information as an admission control request message 12 to the third administrative domain first hop transport network co-ordinator 2132, which performs its own admission control request and response message exchange with the admission control interface of transport network TN5. Co-ordinator 2132 merges the admission control response information from transport network TN5 with the admission control request information, and forwards it to third administrative domain, second hop transport network co-ordinator 2138. Co-ordinator 2138 undergoes its own admission control request and response message exchange with the admission control interface of transport network TN6, merges the admission control response information from transport network TN6 with the received admission control request information, and forwards the updated admission control information back to co-ordinator 2132 in co-ordination request message 14. Co-ordinator 2132 then forwards the updated admission control information to the third hop administrative domain co-ordinator 2131 in an admission control response message. At such a point in time, network reservations have been made for the flow across each of the transport networks TN1 to TN6. In order, to inform the receiving application 2102 of the reservations, third hop administrative domain co-ordinator 2131 passes the admission control information including the overall response and the overall QoS description to the application 2102 in a co-ordination request message, and if the application accepts the granted QoS it responds with a co-ordination request message 17 to third hop administrative domain co-ordinator 2131, which is then forwarded as co-ordination response message 18 to second hop administrative domain co-ordinator 2121, and then on to the first hop administrative domain co-ordinator 2111, as co-ordination request message 19. The QoS signaller of application 2101 then receives a final co-ordination response message containing the overall QoS description and the overall response as co-ordination response message 20, from first hop administrative domain co-ordinator 2111.

Thus, with such a hierarchical arrangement it becomes necessary for co-ordinators within any particular layer to know the addresses of co-ordinators only within its same layer, and for transport network level co-ordinators, to know the addresses of co-ordinators within the same administrative domain. For administrative domain level co-ordinators, it is necessary only to know the signalling addresses of other administrative domain level co-ordinators. Likewise, for QoS signallers, it is necessary only to know the signalling addresses of first hop administrative domain co-ordinators. Thus, the benefits of the co-ordination of admission control request and response messages described previously in respect of the first embodiment are obtained, and the requirement to know addresses of many co-ordinators are much reduced by the hierarchical arrangement.

FIG. 24 illustrates the operation of the hierarchical co-ordination layer in "non-blocking mode". More particularly, a co-ordination request message containing admission control request information including a required QoS description is received from the QoS signaller acting for application 2101, at the first hop administrative domain 2111. The admission control request information is then forwarded as an admission control request message to the first hop transport network co-ordinator 2112, and, because the co-ordinators are acting in "non-blocking" mode a co-ordination request message 2 forwarding on the admission control request information to the second hop administrative domain co-ordinator 2121 is also sent. At the first hop transport co-ordinator 2112 the admission control request message A is received, and the admission control request information is immediately forwarded to the second hop transport network co-ordinator 2118 as co-ordination request message B. Co-ordinator 2112 also forwards the admission control request information to the local admission control interface of transport network TN1 as an admission control request message, and once an admission control response is received from transport network TN1, co-ordinator 2112 waits for a co-ordination response message from co-ordinator 2118. On receipt of co-ordination request message B co-ordinator 2118 performs the admission control request and response message exchange with the admission control interface of transport network TN2, and having merged the admission control response information on receipt with the request information, sends a co-ordination response message C back to co-ordinator 2112. Co-ordinator 2112 can then merge the admission control information contained in the co-ordination response message C with its local admission control response information, and sends an admission control response message D containing the updated QoS description and response to first hop administrative domain co-ordinator 2111. First hop administrative domain administrator 2111 then waits to receive a co-ordination response message from second hop administrative domain co-ordinator 2121.

At second hop administrative domain co-ordinator 2121, on receipt of the co-ordination request message 2 the admission control response information including the overall requested QoS description is forwarded as co-ordination request message 3 to third hop administrative domain co-ordinator 2131. At the same time, second hop administrative domain co-ordinator 2121 forwards the admission control request information as an admission control request message A to second domain, first hop transport network co-ordinator 2122. Co-ordinator 2122 performs its own admission control request and response message exchange with the admission control interface of transport network TN3, and also forwards the admission control request information as co-ordination request message B to second domain, second hop transport network co-ordinator 2128. Co-ordinator 2128 performs its own admission control request and response message exchange with the admission control interface of transport network TN4, and having merged the admission control response information received from network TN4 with the request sends a co-ordination response message C back to co-ordinator 2122. Co-ordinator 2122 then merges the admission control response information then contained in co-ordination response message C with its own local admission control response information, and sends an admission control response message D with the updated admission control response information (comprising the QoS description and response flag) to second hop administrative domain co-ordinator 2121. Administrative domain co-ordinator 2121 then does nothing, awaiting the receipt of co-ordination response message 6 from the third hop administrative domain co-ordinator 2131.

At third hop administrative domain co-ordinator 2131, the co-ordination request message 3 is received, and immediately forwarded to the receiving application 2102 as co-ordination request message 4. At the same time, the admission control request information is forwarded as admission control request message A to the third administrative domain, first hop transport network co-ordinator 2132. Co-ordinator 2132 performs its own admission control request and response message exchange with the admission control interface of transport network TN5, and also forwards the admission control request information as co-ordination request message B to co-ordinator 2138 of transport network TN6. Co-ordinator 2138 performs an admission control request and response message exchange with the admission control interface function of transport network TN6, and sends a co-ordination response message C containing the updated QoS description and response incorporating transport network TN6 admission control response to co-ordinator 2132. Co-ordinator 2132 merges the received admission control response information with its own admission control response information, and sends an admission control response message D back up to third hop administrative domain co-ordinator 2131. Administrative domain co-ordinator 2131 then waits to receive a co-ordination response message from application 2102.

Assuming the requested QoS is acceptable to receiving application 2102, it sends a co-ordination response message 5 back to third hop administrative co-ordinator 2131. The admission control information contained within co-ordination response message 5 (which has yet to be modified) is then merged with the admission control response information received from co-ordinator 2132, and the updated admission control response information is forwarded as co-ordination response message 6 to second hop administrative domain co-ordinator 2121. Co-ordinator 2121 then merges the received admission control response information with its local admission control response information received from co-ordinator 2122, and sends the updated admission control response information as co-ordination response message 7 to first hop administrative domain co-ordinator 2111. Co-ordinator 2111 then merges the received admission control response information with its local admission control response information received from co-ordinator 2112, and sends a final co-ordination response message 8 back to the QoS signaller of sending application 2101.

Thus, even when acting in "non-blocking" mode the hierarchical co-ordination layer of the second embodiment of the invention is able to serve an admission control request by receiving a single admission control request in the form of a co-ordination request message, and provide a single admission control response via a co-ordination response message.

Additionally, within embodiments of the invention a QoS signalling entity need only know the signalling interface to, the first hop coordinator, and does not need to know how to contact the transport network admission control interface directly. Thus, by providing the coordinators in a coordinator layer on top of the admission control interface of the transport network, and having the interface to the coordinator defined in terms of the coord( ) messages discussed above, a common interface can be provided to any QoS signalling entity which is independent from the transport network.

Within the above described embodiments we have concentrated on the coordinator aspects of the present invention, which are independent of the specific forms of QoS request types and can be used to coordinate admission control irrespective of the form of the QoS requests and responses. However, in the embodiments to be described next we further address the additional problems of the prior art noted earlier that within the prior art the data source 10 or QoS signaller 30 must typically communicate with the data transport network 20 so as to establish QoS for a particular flow, using QoS signalling messages specific to the data transport network QoS technology in use.

To overcome the further problems, in further embodiments of the invention which may take any of the embodiments described above as their basis, an admission control interface 40 which receives the admission control requests from a coordinator 50 includes a translator entity which translates those requests into the form required by the QoS mechanism employed within the data transport network 20. In this respect, therefore, the admission control interface 40 of the data transport network 20 can be considered to be a QoS translator, and is therefore referred to below as a translator 40.

The translator 40 acts as an intermediary between the coordinators 50, and the admission control functions of the data transport network 20, accepting admission control requests from a co-ordinator 50 which lies immediately above the admission control function, and responding back to the coordinator 50 with information concerning the QoS reservation which has been made. The provision of translators 40 between the coordinators 50 and the admission control functions of the transport networks removes the need for any QoS signaller to understand the QoS mechanisms of each transport network 20 which an IP flow must traverse.

The message flows which pass between a coordinator 50 and a translator 40 are, as described previously, the admission control request/response messages ac_req( ) and ac_res( ) mentioned earlier, and shown in FIG. 9. Here, an admission control request message 320 contains at least the flow ID for which QoS is being requested, as well as a QoS description describing the QoS level required by the data source. Please note that the QoS description may have been added by the QoS signaller 30, or received from the data source 10 in a service request message passed to the QoS signaller. The QoS description carries the performance constraints that the end-user application requires in order to provide the service requested by the end user.

Upon receipt of the admission control request message 320, the translator 40 performs technology specific checks between the translator 40 and the data transport network 20, to determine whether the data transport network 20 is able to provide the requested QoS. These checks are described in more detail later. Once the checks have been performed, the translator 40 sends an admission control response message 340 back to the QoS signaller 30, which contains a response variable indicating whether or not the QoS request was successful, failed, or whether the QoS description had to be degraded, together with, if appropriate, a description of the degraded QoS characteristics. The coordinator 50 which generated the admission control request message receives this response message, and then generates a coord(REQ) or coord (RES) message as described in the previously described embodiments, dependent on whether it is operating in blocking or non-blocking mode, and whether it is a last-hop coordinator.

One of the purposes of the presently described embodiments of the present invention using the translator entity 40 between the coordinators 50 and the network admission control is to permit a sending application to request a specific quality of service without that request having to be in a particular form or comply with requirements for the QoS architecture within the data transport networks. The reason for this is that given the many types of QoS architecture which may be used in a data transport network, it has not proved particularly feasible to produce applications capable of interfacing with all such QoS architectures. In the presently described embodiments of the present invention, therefore, we use the concept of the provision of an end to end service, being a QoS service understood by applications, rather than a transport network specific QoS service. Such an end to end service definition is then translated into a transport specific QoS service by the translator entity 40.

In particular, within the presently described embodiments of the present invention we define three different types of end to end service. A first type is defined as the "elastic" service. This is equivalent to the "best effort" services commonly provided in transport networks, and relates to packets being forwarded as soon as possible. Such an elastic service would be the default service given to an IP flow generated by an application, in the absence of any specific QoS requests.

A second type of service is the "real time intolerant service". As shown in the table in FIG. 8, a real time intolerant service is characterised by providing a guaranteed minimum data rate, and a guaranteed maximum delay time. Additionally, the service provides a very low jitter, and no packet loss. Such a service might be requested, for example, by a video streaming application, such as a video conferencing application. Such an end to end service maps on to the Guaranteed Delivery Service in an Integrated Services transport network, or the Expedited Forwarding class in a DiffServ network. To invoke such a service, the application or QoS signaller should include the service request, as well as a set of traffic characterisation parameters in overall QoS description part 1096 of the coord(REQ) message. In particular, in the presently described embodiments of the present invention we envisage the traffic characterisation parameters including the average data rate required, a measure of the "burstiness" of the traffic to be generated, as well as the peak rate of the traffic. Additional parameters are the minimum packet size, and maximum packet size. Further details of these parameters will be discussed later.

A third type of end to end service is that of the "real time tolerant" service. This may be used for applications which are rate adaptive or delay adaptive, and the service is characterised by providing a low level of packet loss, and a high data rate within the specified traffic envelope. That is, provided the real time tolerant application sticks to its assigned QoS, a high data rate will be provided.

With the above defined types of end to end services, the translator contained within the presently described embodiments is intended to take a request for end to end service of a particular type, and translate it into the transport specific QoS architecture, such as an Integrated Services architecture, or the Differentiated Services architecture. This is achieved by storing at the translator 40 a service type translation table which indicates to what type of flow based QoS or class based QoS the end to end service types should be mapped. The service type translation table stored at the translator 40 corresponds to the table shown in FIG. 8, but without the second and third columns thereof. Thus, by looking up the end to end service type requested, and then reading along the rows of the table until the column is the column relating to the particular QoS architecture used in the transport network, then the transport network QoS type can be selected. Thus, for example, suppose a translator 40 is a translator for a transport network which uses the DiffServ architecture, and the translator receives a request for real time intolerant service, then from the table the translator can see that the QoS request needs to be translated into the Expedited Forwarding class of the DiffServ architecture. Similarly, as another example, suppose the translator of a transport network which uses the Integrated Services architecture receives a service request for real time tolerant service, then that is translated into the Controlled Load service of the transport network.

The operation of the translator 40 within the presently described embodiments of the present invention will now be described with respect to FIG. 5. Please note that by way of example the presently described embodiments of the invention may be used in a multi-protocol label switching (MPLS) network, in which case IP flows are mapped to label switched paths (LSPs) which are set up to provide the required QoS. This mapping may be on a one to one basis i.e. a single IP flow is mapped to a single LSP, or where an LSP is over provisioned with resources, more than one IP flow may be mapped thereto, provided the LSP is capable of handling the cumulative quality of service requirements of the IP flows matched thereto.

In other embodiments, a digital subscriber line (DSL) transport network which uses asynchronous transfer mode as the network technology may be used. In this case, virtual circuits can be created with particular QoS characteristics, and IP flows are matched to VCs which are able to meet the IP flow QoS requirements. As with the MPLS case, if a virtual circuit is over provisioned with resources, more than one IP flow may be mapped thereto, provided the virtual circuit is able to handle the cumulative QoS requirements of the different IP flows.

In view of the above, within the description below we describe mapping IP flows to either identified LSPs (in an MPLS embodiment) or to a VC (in an ATM based DSL embodiment).

Figure 5:
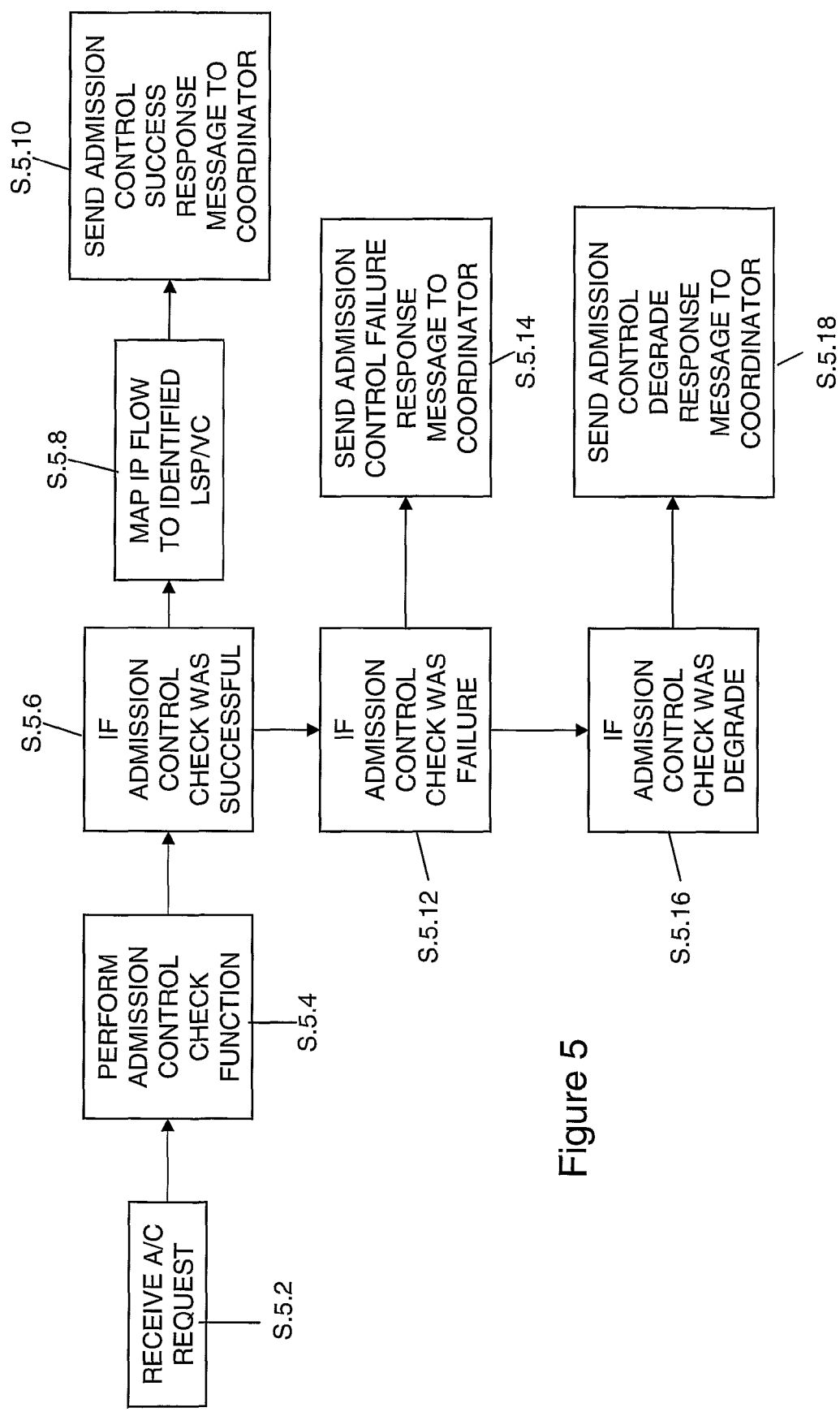
FIG. 5 is a flow diagram detailing the steps performed at an admission control interface of a transport network domain in an embodiment of the present invention.

Turning now to FIG. 5, the overall operation of a translator 40 will be described. Additionally, set out below is a Pseudo code representation of the operation of the translator 40.

```
Upon receipt of ac_req(flow_id, qos_des)
{
    // This is transport specific function, in this example MPLS
    result = admission_control_check(flow_id, qos_des,
    qos_des_degrade, lsp);
    // Do different things depending on the result
    if (result == success)
    {
        // add entry in table which maps IP flow id to LSP
        install_policy(flow_id, lsp);
        response = success;
    }
    // admission control check has failed
    else if (result == failure)
    {
        Response = failure;
    }
    // admission control check will have to degrade the new flow
    else
    {
        response = degrade;
        // modify requested qos description with degraded version
        qos_des = qos_des_degrade;
    }
    // Send admission control response to QoS signaller
    // if response is degrade, then qos_des contains the new qos
    description; otherwise, qos_des can be ignored
    send (ac_res(response, qos_des), qos_signaller);
}
```

At step 5.2 the translator 40 receives an admission control request message 320, from the coordinator 50 responsible for coordinating admission control responses for the transport network to which the particular translator 40 belongs. The admission control request message 320 contains the information shown in FIG. 9. In particular, the message contains the IP flow ID for which QoS has been requested. A service request portion is then included, followed by a portion including the requested QoS description. The whole message may be in an agreed XML file format. Typically, at least the service request portion 904 and QoS description portion 906 will have been received at the coordinator 50 in the overall QoS description portion 1906 of the coord(REQ) message received from the QoS signaller 30 (for a first hop coordinator) or an upstream coordinator (for an intermediate or last hop coordinator).

The service request portion 904 contains a first part 9042 which indicates the type of service which is requested. As noted previously, in embodiments of the invention the service type may be either an elastic service, a real time tolerant service, or a real time intolerant service. A second part of the service request portion is an indication of the requested data rate in terms of bits per second, at part 9044. A third part is also an indication of a delay slack term in microseconds, at part 9066. Whether a data rate or delay slack term is included will depend upon the type of service request.

More particularly, where the type of service requested is an elastic service, then part 9042 of the service request portion 904 will indicate that an elastic service is requested. However, with such an elastic service no specific data rate is requested, and neither is an indication of delay slack required, and hence the part 9044 and 9066 will be empty, and carry nil indicators.

Similarly, where the service request is for an elastic service, no particular QoS is being requested, and so the requested QoS description 906 will also contain nil indicators, as no particular traffic characterisation is required.

Alternatively, where the service request type is for a real time intolerant service, then the part 9042 of the service request portion 904 will indicate that a real time intolerant service is requested. With such a service type it is necessary to indicate both a requested date rate at part 9044, as well as a delay slack term at part 9066. Additionally, when requesting such a service an application must also provide traffic characterisation parameters, as discussed previously. These are placed in the requested QoS description portion 906, at 9062. As noted previously, the traffic characterisation parameters include the average rate requested, in bits per second. Additionally included is a peak rate request, which equals the average rate, plus some additional value delta. Thus, the units of peak rate are additionally in bits per second. A third parameter is that of "burstiness", which is equal in the presently described embodiments of the invention to the peak rate, plus a further different term delta_2. Note that delta and delta_2 may be different, or the same.

Additionally provided as part of the traffic characterisation in the QoS description is an indication in bytes of the minimum packet size which the application expects to send, and the maximum packet size. All of the parameters noted above are used as matching elements to match the requested QoS for the flow to offered QoS, for example via LSPs and VCs of the transport network, as appropriate.

Returning to FIG. 5, therefore, after receiving the admission control request message in the form described above, at step 5.4 the translator 40 performs an admission control check function, as described later with respect to FIGS. 6 and 7. The admission control check function takes the service type request, flow ID, and traffic description as inputs, and outputs a response variable indicating if the admission control check was successful, a failure, or whether the QoS description needs degrading. Where the response variable indicates "degrade" then the admission control check function also returns a QoS description describing the degraded QoS which has been granted by the network. Further details of the admission control check function will be given later.

Following the admission control check function, at step 5.6 an evaluation is performed as to whether the admission control check was successful i.e. was the response variable equal to "success". If this was the case, then at step 5.8 the translator controls the admission control interface of the transport network to map the flow ID of the particular IP flow to the transport network service in the form of the LSP or VC which was identified as being able to provide the requested QoS. Here, the transport network maintains a table mapping IP flows onto different LSPs or VCs as appropriate, and at step 5.8 a new entry is added in the table specifying the mapping between the IP flow and the VC or LSP which was identified as being able to provide the requested QoS. Thereafter, packets belonging to the IP flow are transported for that hop on the LSP or VC identified by the mapping table. Following this step, at step 5.10 the translator sends an admission control response message back to the coordinator 50 which sent the request message, containing a response variable indicating "success".

The format of the admission control response message is shown in FIG. 10. Here the admission control response message 340 contains a first part 1002 containing the flow ID to which the message relates, and a second part 1004 containing the response variable. As noted previously, the response variable may take a value of "success" or "failure" or "degrade", as noted in part 1014. Additionally provided is a further part 1006 which contains the granted QoS description, being the QoS granted by the network. In this part is contained a representation (for example in XML format) of the QoS parameters which have actually been granted by the network. Where the response is "success", then these QoS parameters can be expected to match the requested QoS parameters, in such a case i.e. where the response is "success" the granted QoS description 1006 may be considered optional. However, where the response part 1004 contains the variable "degrade" then the granted QoS description 1006 contains the QoS parameters 1016 indicating the degraded QoS granted by the network to the application.

Again returning to FIG. 5, if at step 5.6 the admission control check function returns a value that was not "success" then processing proceeds to step 5.12, wherein an evaluation is performed to determine whether the return value was "failure". If this was the case, then processing proceeds to step 5.14, wherein an admission control response message is sent, containing the "failure" value in the response variable part 1004. In this case, the granted QoS description part 1006 may not be included, or may be included but include nil terms.

Finally, if at step 5.12 the admission control check response was not "failure" then processing proceeds to step 5.16 wherein an evaluation is performed to determine if the admission control check response was "degrade". This response will be returned when the transport network is not able to provide an LSP or VC which matches the requested QoS description, in which case, an alternative LSP or VC is chosen which most closely matches the requested QoS. The QoS offered by this next best LSP or VC is indicated in the QoS description. Therefore, when the admission control check function response is "degrade", at step 5.18 the admission control response message is sent which contains "degrade" in a response part 1004, and the QoS description of the LSP or VC to which the flow has been allocated is included in the granted QoS description part 1006. The admission control response message, as noted previously, is received back at the coordinator 50 which sent the admission control request message.

With such an arrangement within presently described embodiments of the invention the application 10 can request QoS using end to end service definitions, which are independent from the transport network QoS definitions, of which there may be many. Thus, a mapping between end to end services and transport network services can be achieved.

Figure 6:
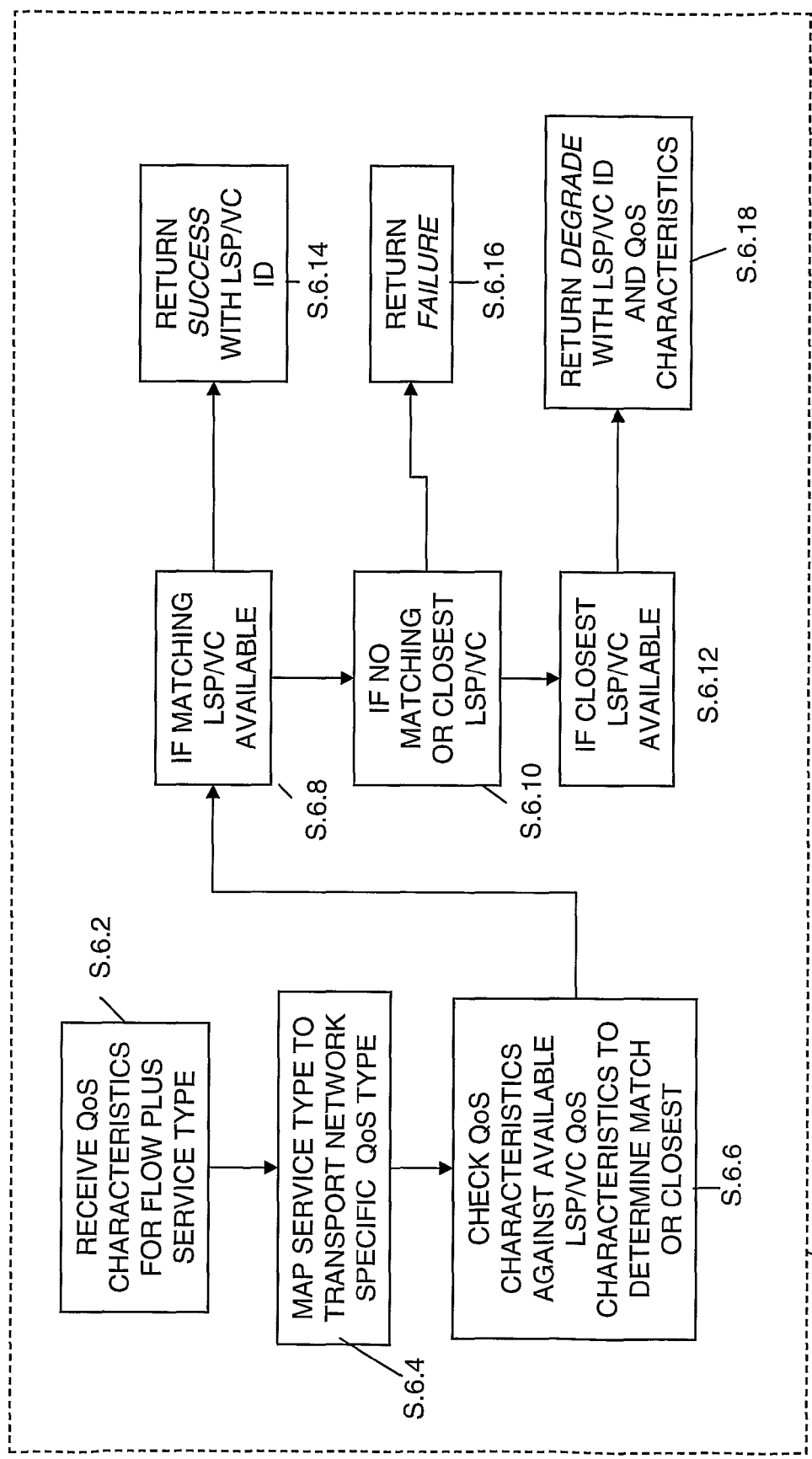
FIG. 6 is a flow diagram of part of the admission control check performed at an admission control interface in a transport network domain within an embodiment of the invention.

FIG. 6 is a flow diagram illustrating how the admission control check function of step 5.4 is performed in more detail. In addition, below is set out a pseudo code representation of the admission control check function, for completeness. Please note that the pseudo-code representation is for an MPLS implementation but can be readily adapted for a DSL VC embodiment.

```
// MPLS specific function
boolean admission_control_check(flow_id, qos_des, qos_des_degrade,
lsp)
{
    while (MPLS finds an available LSP (with certain qos
    characteristics) OR MPLS does not find any available LSP)
    {
        lsp = get_LSP(qos_des);
        // This function queries a table, which is in the form of
        (lsp, lsp_qos_characteristics); and it selects the LSP with
        the closest QoS characteristics to the qos_des of the
        requesting flow
        // check that there are enough resources on that LSP
        response = check_resources(lsp, qos_des);
    }
```

```
    if (response == successful OR response == failure)
    {
        // Don't need to use the qos_des_degrade variable
        qos_des_degrade = null;
    }
    else
    {
        /* MPLS found an LSP which has lower QoS characteristics
        than the requesting flow's QoS description. So, assign to the
        degraded QoS description the characteristics of the LSP that
        MPLS found (i.e. the most suitable with available resources)
        */
        qos_des_degrade = lsp_qos_characteristics;
    }
    return (response);
    /* Additionally, lsp returns the selected LSP where the IP flow will
    be mapped onto; qos_des carries the characteristics of this LSP (if
    the characteristics of this LSP match qos_des; otherwise,
    qos_des_degrade will carry the QoS characteristics of the LSP */
}
```

Referring to FIG. 6, at step 6.2 the admission control check function receives the requested QoS characteristics, plus the service request type. That is, the function has passed to it the contents of part 9042 of the service request portion 904, as well as the traffic characterisation parameters contained in part 9062 of the requested QoS description part 906 of the admission control request message. At step 6.4 the requested service type is mapped to the transport network specific QoS architecture using the service type mapping table of FIG. 8, as described previously. Thus, where the service type indicates that a "real time tolerant" service is requested, and the translator is acting for a DiffServ architecture transport network, then the flow ID will be mapped to the Assured Forwarding service class. Conversely, if the translator operated on behalf of an Integrated Services transport network, then the flow would be treated as a Controlled Load flow.

Having performed the mapping to the transport network specific QoS at step 6.4, at step 6.6 LSPs or VCs (as appropriate) within the identified class, or offering the particular type of flow based service, are checked, to determine whether any available LSPs or VCs have QoS characteristics which match the requested QoS description, or which are the closest thereto. Step 6.6 returns an LSP or VC identifier of an LSP or VC which either matches the QoS characteristics, or is the closest thereto. A particular example of how step 6.6 may be performed will be described later with respect to FIG. 7. However, it should be appreciated by the person skilled in the art that many different types of matching to obtain a matching or closest LSP or VC could be performed.

After step 6.6, at step 6.8 an evaluation is determined as to whether or not a matching LSP or VC was found. In this respect, by "matching" we mean that an LSP or VC was found that was able to provide all of the requested QoS parameters. If this is the case, then at step 6.14 the response "success" is returned, together with the LSP or VC ID of the matched channel.

Alternatively, if at step 6.8 it is determined that no matching LSP or VC was found, then at step 6.10 another evaluation is performed to determine whether there was no matching or closest LSPs or VCs at all. If this was the case, then the function returns the failure value, at step 6.16.

Finally, if the evaluation of step 6.10 returns false, then processing proceeds to step 6.12, wherein an evaluation is determined as to whether or not a closest LSP or VC was available in terms of one which most closely meets the requested QoS parameters, but does not match them completely. If this is the case (as it will be) then at step 6.18 the admission control check function returns the value "degrade" together with the LSP or VC ID of the closest matching available LSP or VC, as well as the QoS characteristics which that LSP or VC is able to provide.

Thus, the admission control check function acts to determine whether transmission paths or circuits are available, and returns the identities of them if they are, or the identity of the next best path or circuit, if available.

Figure 7:
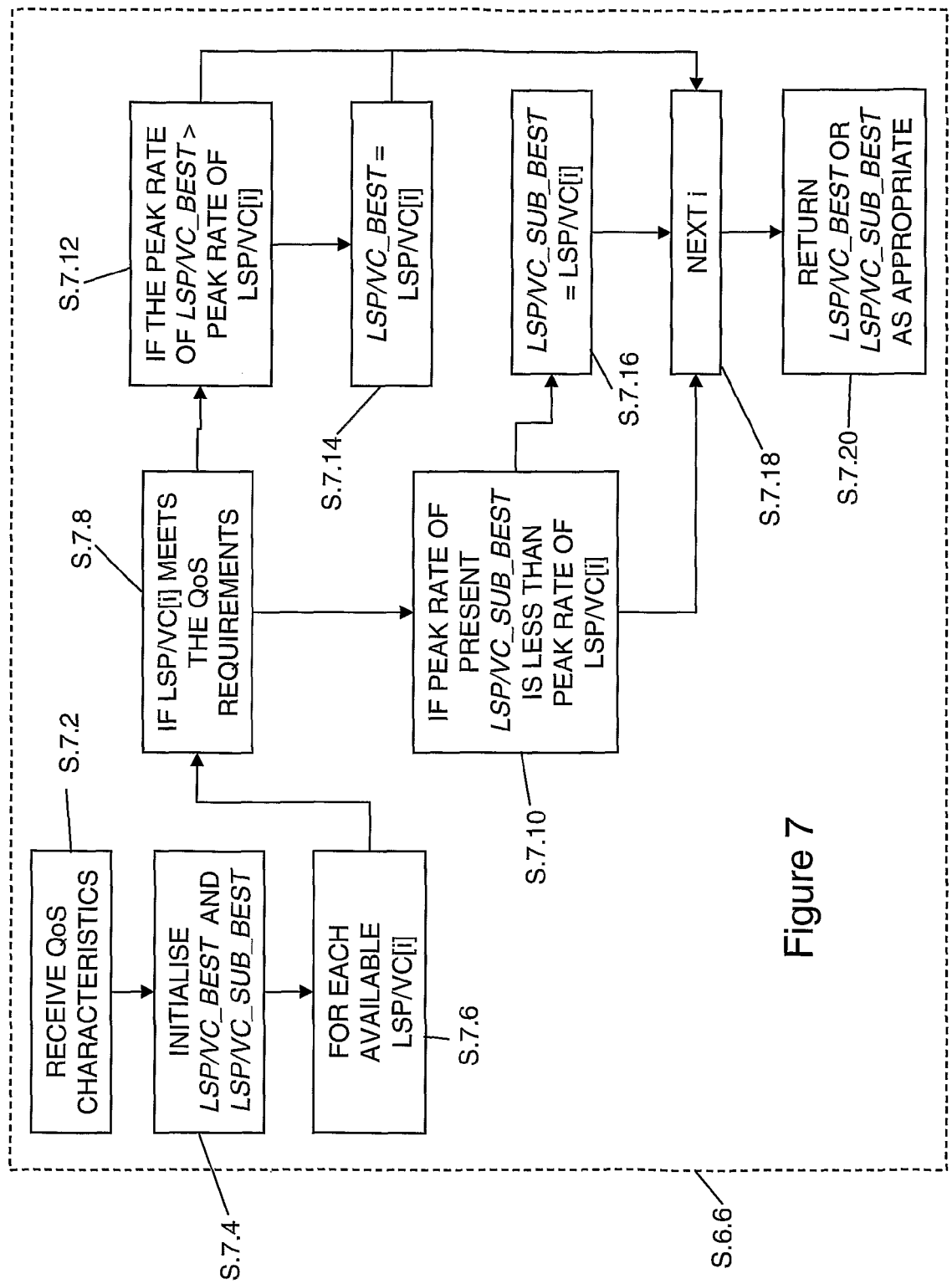
FIG. 7 is a flow diagram of a matching function to match a particular flow to a specific transport network service within an embodiment of the invention.

FIG. 7 gives one example of how step 6.6 of FIG. 6 may be performed. That is, FIG. 7 gives one example as to how the requested QoS characteristics may be matched to available LSPs or VCs. In this respect, FIG. 7, which is provided by way of example only, gives an example of a suitable matching function which maps QoS characteristics to LSP or VC offered QoS characteristics so as to identify an LSP or a VC which either is able to meet the characteristics completely, or alternatively, if no such LSP or VC is available, then it identifies the LSP or VC with the highest peak rate. Where multiple LSPs or VCs are found which meet the QoS characteristics that LSP or VC with the minimum peak rate to meet the QoS description is selected. For completeness, a pseudo code representation of the matching function is given below. Again, please note that the pseudo-code representation is for an MPLS embodiment, but can be readily adapted for a VC embodiment.

```
get_LSP(qos_des)
{
    // Parameters of the QoS description (considered as if it was a C structure)
    // qos_des.p == peak rate
    // qos_des.m == minimum packet size
    // qos_des.M == maximum packet size
    // Variables of the routine
    lsp_type LSP_best == NIL // best LSP
    lsp_type LSP_sub_best == NIL // if no LSP can fully meet the QoS request, the algorithm remembers the one with highest peak rate
        LSP_best.p = INFINITY;
        LSP_sub_best.p = NIL;
        for (i=0; i < MAX_NUMBER_OF_LSP; i++)
        {
            // if the current LSP satisfies constraints of QoS description,
    i.e. the QoS request can be fully met
            if (qos_des.p <= LSP[i].p && qos_des.m >= LSP[i].m &&
qos_des.M <= LSP[i].M)
            {
                // the algorithm looks for the LSP with the min peak rate
    among the LSPs which
                // can fully meet the peak rate in the QoS description,
    i.e. they have LSP[i].p >= qos_des.p
                if (LSP_best.p > LSP[i].p)
                    LSP_best = LSP[i]
            }
            else
            {
                if (LSP_sub_best.p < LSP[i].p)
                    LSP_sub_best = LSP[i]
            }
        }
        // test whether the algorithm found a suitable LSP
        if (LSP_best == NIL)
            return (LSP_sub_best)
        else
            return (LSP_best)
}
```

With reference to FIG. 7, the matching function of step 6.6 first of all obtains the QoS characteristics from the requested QoS description, at step 7.2. Then, at step 7.4 the matching function initialises two variables being "LSP/VC_best", and "LSP/VC_sub_best", which will keep track of the identified LSP or VC which meets the QoS requirements, or comes closest. These are initialised to contain a nil value.

Then, at step 7.6 a processing loop is initiated to compare each available LSP or VC within the particular service class (for a DiffServ network) or which is able to provide the flow-based service type (for an Integrated Services Network) which is available to service the QoS request. The FOR loop commenced at step 7.6 processes each of these available LSPs or VCs in turn.

The first step within the FOR loop is that of step 7.8, which is an evaluation to determine whether the presently processed LSP or VC, being LSP/VC[i] meets the QoS characteristics. That is, within this particular embodiment the QoS characteristics which are considered are the peak rate, the minimum packet size, and the maximum packet size. These are compared against the corresponding parameters of each LSP/VC, to determine whether the QoS requirements are met. If the presently processed LSP/VC is able to meet these QoS requirements, in that it has available resources to meet the requirements, then processing proceeds to step 7.12, wherein a further evaluation is performed to determine whether the peak rate of the "LSP/VC_best", being the LSP or VC which has previously been found and allocated to this variable, is greater than the peak rate of the LSP or VC which is presently being processed. If this is the case, then at step 7.14 the presently processed LSP or VC is equated with the LSP/VC_best variable i.e. the presently processed LSP or VC is identified as the best matching LSP or VC. This second evaluation of step 7.12 ensures that of those LSPs or VCs which can meet the QoS requirements, the one with the lowest peak rate is chosen.

If at step 7.8 the LSP or VC being presently processed cannot meet the QoS requirements, then an evaluation is performed at step 7.10 as to whether the peak rate of the LSP or VC presently assigned to the "LSP/VC_sub_best" variable is less than the peak rate of the LSP or VC being presently processed. If this is the case then at step 7.16 the LSP/VC_sub_best variable is initialised with the ID of the presently processed LSP or VC.

As noted above, the outcome of performing the above processing is that the algorithm identifies that LSP or VC which meets all the QoS requirements but which has the lowest peak rate available, the ID of which is then returned as the variable LSP/VC_best. Additionally, the algorithm also identifies that LSP or VC which does not meet the QoS requirements but which then has the maximum peak rate. At step 7.20 the LSP or VC ID contained within the variable LSP/VC_best is returned unless the value of the variable is nil, in which case the LSP or VC ID contained within the LSP/VC_sub_best variable is returned.

As mentioned previously, the matching algorithm of FIG. 7 is but one example of how the QoS characteristics can be matched to available QoS in LSPs or VCs, and other matching algorithms may be used.

It should be noted that the translator entity 40 with the operation as described above may be used together with the coordinators 50 of either of the previously described first or second embodiments to provide the further embodiments of the invention. In particular the translator entity 40 typically sits between a coordinator 50 and the native admission control interface of a transport network 20 which an IP flow must traverse. By using such a translator function in conjunction with coordinators of the first and second embodiments described previously, then the benefits of coordination of admission control requests and responses are obtained, but with the added advantage that end to end QoS descriptions can be mapped onto technology specific QoS architectures. The additional problem that any particular application would otherwise, in the absence of the further embodiments of the invention, have to be able to signal many different types of QoS, in accordance with the numerous available QoS architectures can therefore also be overcome.

Figure 25:
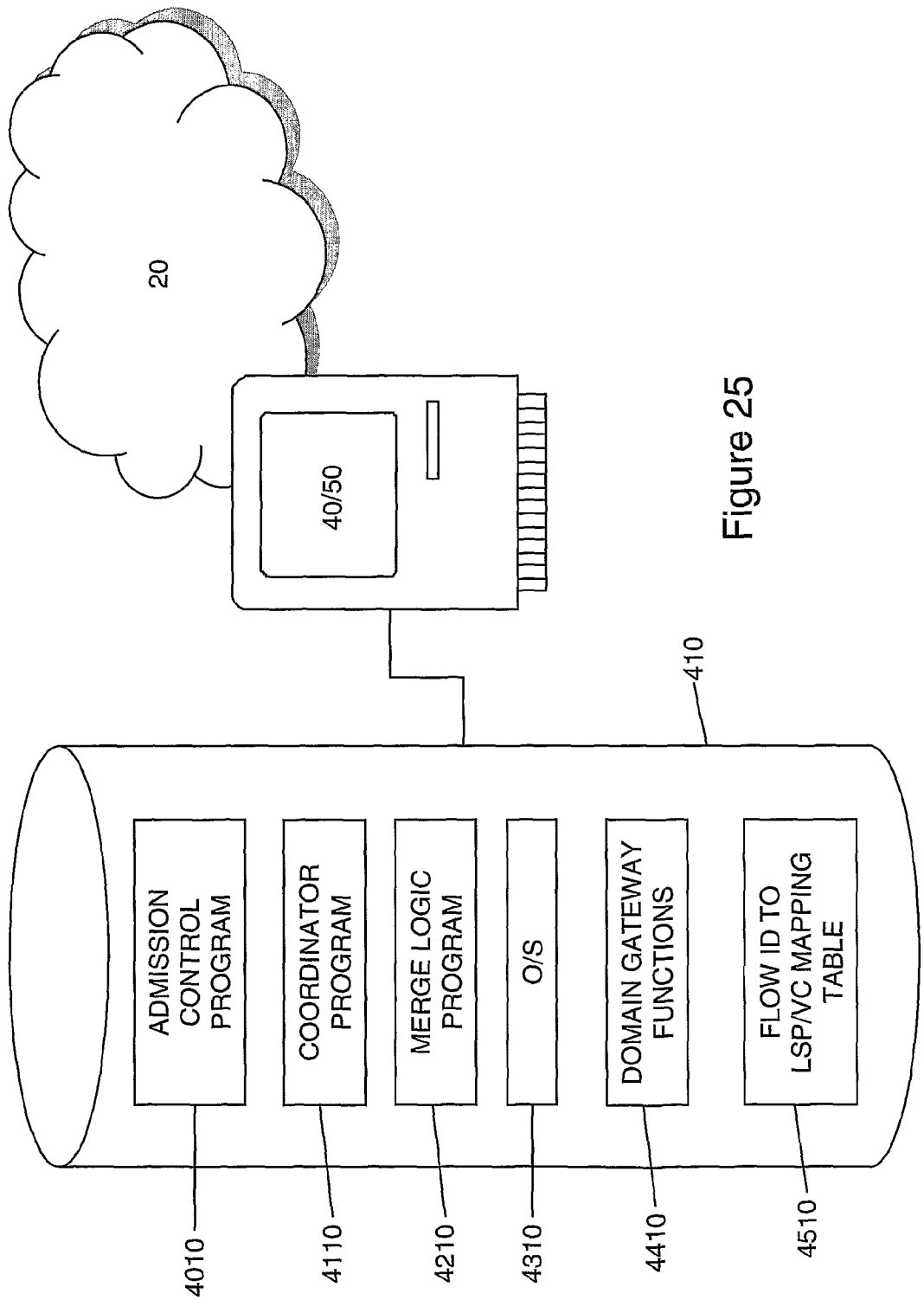
FIG. 25 is a block diagram illustrating a gateway router provided with software to allow it to provide embodiments of the present invention.

FIG. 25 illustrates a computer system 40/50 acting as a domain gateway to a transport network 20. The computer system 40/50 is provided with a computer readable storage medium 410, together with a processor, memory, input and output functions, or the like, which are conventional. The computer system 40/50 acting as the domain gateway for the transport network 20 has processes running thereon which perform the admission control interface function 40 of the transport network 20, as well as the transport network level co-ordinator entity 50. Therefore, in order to provide such function stored on the computer readable storage medium 410 is an admission control program 4010, which provides the admission control interface functionality. In particular, in embodiments based on the third embodiment of the invention described above, the admission control program 4010 acts to provide the translator functionality described. In other embodiments of the invention, for example those based on the previously described first and second embodiments, the admission control program 4010 acts to perform the admission control interface functions described previously, i.e. to accept the admission control request information including a QoS description, to check transport network service availability against the QoS description, and to make any network reservations in accordance with the QoS description and to report back. Inherent in this functionality is the ability to grant a degraded level of QoS, if necessary.

In order to provide the transport network level co-ordinator entity 50 which sits above the admission control interface, the computer readable storage medium 410 is also provided with a co-ordinator program 4110, which when run by the computer system provides a co-ordinator entity 50 which operates as described in the above embodiments. A separate merge logic program 4210 is provided which can be called by the co-ordinator program 4110, and which provides the admission control response information merging functions, as described previously with respect to FIG. 18. Provision of a separate merge logic program 4210 allows for different merging functions to be used, if required. For example, as described previously various different mechanisms can be employed to determine whether one particular QoS description which is in a different format to another QoS description provides a lower level of QoS, and any of the different strategies possible to perform this function can be encoded in the merge logic program 4210. Together the programs 4110 and 4210 provide the co-ordinator entity 50 functionality, when run by the computer system.

Additionally provided within the computer readable storage medium 410 are operating system software 4310, which is conventional, as well as domain gateway function software 4410, to enable the computer system to act as the domain gateway, and again which is conventional. In accordance with embodiments based on the third embodiment of the invention, however, additionally provided is a flow ID to LSP or VC mapping table 4510, which maps flow IDs to identified LSPs or VCs, and which is referred to by the computer system and in particular the admission control process 4010 running thereon, when it receives a packet from the data source 10 with a particular flow ID, so as to know onto which of the LSPs or VCs it must put that packet. In this respect, when operating in this manner the computer system is a router of the transport network.

Various modifications may be made to the above described embodiments to provide further embodiments, which will fall within the scope of the appended claims.

The invention claimed is:

1. A method of coordinating admission control messages across multiple transport network domains for performance by a coordinator entity acting for a local subset of one or more of the transport network domains, the method comprising the steps:
    i) receiving at least one coordination request message containing admission control request information;
    ii) forwarding an admission control request message containing the admission control request information towards an admission control interface or functions of the subset of one or more of the transport network domains;
    iii) receiving an admission control response message containing local admission control response information derived from admission control responses of the or each of the local subset of transport network domains made in response to the admission control request information;
    iv) generating a further coordination message in dependence on at least the admission control response information; and
    v) transmitting the further coordination message;
    wherein the coordinator entity acts in a non-blocking mode, comprising the step of, after receiving the at least one coordination request message, forwarding the coordination request message to a next hop coordinator entity acting for a next neighbouring subset of one or more transport network domains;
    wherein the method further comprises: receiving a coordination response message containing admission control response information from the next hop coordinator entity;
    wherein the generating step then generates, as the further coordination message, a coordination response message containing admission control response information generated in dependence on the local admission control response information and the received admission control response information, and the transmitting step comprises transmitting the coordination response message; and
    wherein the coordination response message is transmitted to a previous hop coordinator entity acting for a previous neighbouring subset of one or more transport network domains.

2. A method according to claim 1, wherein the local admission control response information indicates the status and/or characteristics of granted transport network reservation(s) made at the or each of the subset of transport network domains in response to the admission control request information.

3. A method according to claim 1, wherein the admission control request information includes a flow QoS description of requested QoS.

4. A method according to claim 3 wherein the flow QoS description comprises a first part indicating the requested QoS type, and a second part comprising one or more requested QoS parameters.

5. A method according to claim 4, wherein the requested QoS type comprises an end-to-end type selected from the group comprising: elastic; real-time tolerant; and real-time intolerant.

6. A method according to claim 4, wherein the requested QoS parameters comprise one or more selected from the following: average rate; peak rate; burstiness; minimum packet size; and maximum packet size.

7. A method according to claim 1, wherein the admission control response information includes a flow QoS description of granted QoS.

8. A method of coordinating admission control messages across multiple transport network domains for performance by a coordinator entity acting for a local subset of one or more of the transport network domains, the method comprising the steps:—
   i) receiving at least one coordination request message containing admission control request information;
   ii) forwarding an admission control request message containing the admission control request information towards an admission control interface or functions of the subset of one or more of the transport network domains;
   iii) receiving an admission control response message containing local admission control response information derived from admission control responses of the or each of the local subset of transport network domains made in response to the admission control request information;
   iv) generating a further coordination message in dependence on at least the admission control response information; and
   v) transmitting the further coordination message;
   wherein a hierarchy of coordinator entities are provided of which the coordinator entity acting for the local subset of transport network domains forms a part, the hierarchy comprising a lowest layer of coordinator entities each of which acts for a single transport network domain, and one or more higher layers of coordinators, a coordinator in a higher layer acting to exchange messages with coordinators in the next lower layer, whereby to aggregate admission control responses from the multiple transport network domains.

9. A method according to claim 8, wherein the coordinator entity acts in a blocking mode wherein the generating step comprises generating, as the further coordination message, a further coordination request message in dependence on the local admission control response information and the received admission control request information, and the transmitting step comprises transmitting the further coordination request message to a next hop coordinator entity acting for a next neighbouring subset of one or more transport network domains.

10. A method according to claim 9, wherein the generating step further comprises: comparing the local admission control response information with one of:—
   i) in blocking mode, the admission control request information; or
   ii) in non-blocking mode, the admission control response information received in the coordination response message;
   determining that information of the compared information which represents the minimum of the two;
   and producing the further coordination message containing admission control request or response information corresponding to the determined minimum information.

11. A method according to claim 8, wherein the coordinator entity acts in a non-blocking mode, comprising the step of, after receiving the at least one coordination request message, forwarding the coordination request message to a next hop coordinator entity acting for a next neighbouring subset of one or more transport network domains.

12. A method according to claim 11, wherein the method further comprises:
   receiving a coordination response message containing admission control response information from the next hop coordinator entity;
   wherein the generating step then generates, as the further coordination message, a coordination response message containing admission control response information generated in dependence on the local admission control response information and the received admission control response information, and the transmitting step comprises transmitting the coordination response message.

13. A method according to claim 8, wherein for a coordinator entity acting in the lowest layer, the forwarding step comprises forwarding the admission control request message to an admission control interface of the transport network domain for which it acts.

14. A method according to claim 8, wherein for a coordinator entity acting in a layer other than the lowest layer, the forwarding step comprises forwarding the admission control request message to a coordinator entity in the next layer down towards the transport networks.

15. A method of coordinating admission control signals across multiple transport network domains, comprising:
   providing, for a transport network domain, at least one coordinator entity arranged to exchange admission control request and response messages with an admission control interface of the transport network domain for which it was provided; and
   exchanging coordination request and response messages between the coordinator entities of the multiple transport network domains to combine the admission control responses of the domains;
   wherein the coordinator entity operates in a non-blocking mode, wherein a received coordination request message containing an admission control request is forwarded on to a next coordinator entity for a next-hop transport network domain prior to an admission control response being obtained from the network domain for which the coordinator entity acts;
   wherein for a received coordination request message containing an admission control request an admission control response is obtained from the network domain for which the coordinator entity acts, which response is combined with an admission control response received in a coordination response message from the next coordinator entity for a next-hop transport network domain;
   wherein the coordination response message is then forwarded to a previous coordinator entity for a previous-hop transport network domain.

16. A method according to claim 15, wherein the coordinator entity operates in a blocking mode, wherein for a received coordination request message containing an admission control request an admission control response is obtained from the network domain for which the coordinator entity acts, which response is combined with the admission control request before the coordination request message is forwarded on to a next coordinator entity for a next-hop transport network domain.

17. A method according to claim 15, wherein a hierarchy of coordinator entities are provided, the hierarchy comprising a lowest layer of coordinator entities each of which acts for a single transport network domain, and one or more higher layers of coordinators, a coordinator in a higher layer acting to exchange messages with coordinators in the next lower layer, whereby to aggregate admission control responses from the multiple transport network domains.

18. A method according to claim 15, wherein the admission control response messages contain information indicating the status and/or characteristics of granted transport network reservation(s) made at the transport network domains in response to the admission control request messages.

19. A method according to claim 15, wherein the admission control request messages contain information including a flow QoS description of requested QoS.

20. A method according to claim 19, wherein the flow QoS description comprises a first part indicating the requested or granted QoS type, and a second part comprising one or more requested QoS parameters.

21. A method according to claim 20, wherein the requested QoS type comprises an end-to-end type selected from the group comprising: elastic; real-time tolerant; and real-time intolerant.

22. A method according to claim 20, wherein the requested QoS parameters comprise one or more selected from the following: average rate; peak rate; burstiness; minimum packet size; and maximum packet size.

23. A method according to claim 15, wherein the admission control response messages contain information including a flow QoS description of granted QoS.

24. A method of coordinating admission control signals across multiple transport network domains, comprising:
providing, for a transport network domain, at least one coordinator entity arranged to exchange admission control request and response messages with an admission control interface of the transport network domain for which it was provided; and
exchanging coordination request and response messages between the coordinator entities of the multiple transport network domains to combine the admission control responses of the domains;
wherein the coordinator entity operates in a blocking mode, wherein for a received coordination request message containing an admission control request an admission control response is obtained from the network domain for which the coordinator entity acts, which response is combined with the admission control request before the coordination request message is forwarded on to a next coordinator entity for a next-hop transport network domain
wherein the combining step further comprises:
comparing the admission control response with one of:
i) in blocking mode, the admission control request information; or
ii) in non-blocking mode, the admission control response information received in the coordination response message;
determining that information of the compared information which represents the minimum of the two; and
producing the further coordination message containing admission control request or response information corresponding to the determined minimum information.

25. A method according to claim 24, wherein the coordinator entity operates in a non-blocking mode, wherein a received coordination request message containing an admission control request is forwarded on to a next coordinator entity for a next-hop transport network domain prior to an admission control response being obtained from the network domain for which the coordinator entity acts.

26. A method according to claim 25, wherein for a received coordination request message containing an admission control request an admission control response is obtained from the network domain for which the coordinator entity acts, which response is combined with an admission control response received in a coordination response message from the next coordinator entity for a next-hop transport network domain.

27. A non-transitory computer readable storage medium storing a computer program or suite of computer programs arranged such that when executed by a computer system it/they cause the computer system to operate in accordance with the method of claim 1.

28. A non-transitory computer readable storage medium storing a computer program suite of computer programs arranged such that when executed by a computer system it/they cause the computer system to operate in accordance with the method according to claim 8.

29. A coordinator system for coordinating admission control messages across multiple transport network domains, the coordinator system acting for a local subset of one or more of the transport network domains, the system comprising:—
a message interface arranged in use to:
i) receive at least one coordination request message containing admission control request information;
ii) forward an admission control request message containing the admission control request information towards an admission control interface or functions of the subset of one or more of the transport network domains; and
iii) receive an admission control response message containing local admission control response information derived from admission control responses of the or each of the local subset of transport network domains made in response to the admission control request information; a control element arranged in use to:
i) generate a further coordination message in dependence on at least the admission control response information;
the message interface being further arranged in use to:
iv) transmit the further coordination message;
wherein the coordinator system acts in a non-blocking mode, wherein the message interface, after receiving the at least one coordination request message, forwards the coordination request message to a next hop coordinator entity acting for a next neighbouring subset of one or more transport network domains;
wherein message interface is further arranged in use to receive a coordination response message containing admission control response information from the next hop coordinator entity, the control element then generating, as the further coordination message, a coordination response message containing admission control response information generated in dependence on the local admission control response information and the received admission control response information, the message interface then transmitting the coordination response message; and
wherein the coordination response message is transmitted to a previous hop coordinator entity acting for a previous neighbouring subset of one or more transport network domains.

30. A system according to claim 29, wherein the coordinator system acts in a blocking mode wherein the control element generates, as the further coordination message, a further coordination request message in dependence on the local admission control response information and the received admission control request information, and the message interface transmits the further coordination request message to a next hop coordinator entity acting for a next neighbouring subset of one or more transport network domains.

31. A system according to claim 29, wherein the local admission control response information indicates the status and/or characteristics of granted transport network reservation(s) made at the or each of the subset of transport network domains in response to the admission control request information.

32. A system according to claim 29, wherein the admission control request information includes a flow QoS description of requested QoS.

33. A system according to claim 32 wherein the flow QoS description comprises a first part indicating the requested QoS type, and a second part comprising one or more requested QoS parameters.

34. A system according to claim 33, wherein the requested QoS type comprises an end-to-end type selected from the group comprising: elastic; real-time tolerant; and real-time intolerant.

35. A system according to claim 33, wherein the requested QoS parameters comprise one or more selected from the following: average rate; peak rate; burstiness; minimum packet size; and maximum packet size.

36. A system according to claim 29, wherein the admission control response information includes a flow QoS description of granted QoS.

37. A coordinator system for coordinating admission control messages across multiple transport network domains, the coordinator system acting for a local subset of one or more of the transport network domains, the system comprising:
  a message interface arranged in use to:
  i) receive at least one coordination request message containing admission control request information;
  ii) forward an admission control request message containing the admission control request information towards an admission control interface or functions of the subset of one or more of the transport network domains; and
  iii) receive an admission control response message containing local admission control response information derived from admission control responses of the or each of the local subset of transport network domains made in response to the admission control request information; a control element arranged in use to:
  i) generate a further coordination message in dependence on at least the admission control response information:
  the message interface being further arranged in use to:—
  iv) transmit the further coordination message;
  wherein the coordinator system acts in a blocking mode wherein the control element generates, as the further coordination message, a further coordination request message in dependence on the local admission control response information and the received admission control request information, and the message interface transmits the further coordination request message to a next hop coordinator entity acting for a next neighbouring subset of one or more transport network domains; and
  wherein the control element is further arranged in use to:—
  compare the local admission control response information with one of:—
  i) in blocking mode, the admission control request information; or
  ii) in non-blocking mode, the admission control response information received in the coordination response message;
  determine that information of the compared information which represents the minimum of the two; and
  produce the further coordination message containing admission control request or response information corresponding to the determined minimum information.

38. A coordinator system for coordinating admission control messages across multiple transport network domains, the coordinator system acting for a local subset of one or more of the transport network domains, the system comprising:
  a message interface arranged in use to:
  i) receive at least one coordination request message containing admission control request information;
  ii) forward an admission control request message containing the admission control request information towards an admission control interface or functions of the subset of one or more of the transport network domains; and
  iii) receive an admission control response message containing local admission control response information derived from admission control responses of the or each of the local subset of transport network domains made in response to the admission control request information; a control element arranged in use to:—
  i) generate a further coordination message in dependence on at least the admission control response information;
  the message interface being further arranged in use to:
  iv) transmit the further coordination message;
  wherein a hierarchy of coordinator entities are provided of which the coordinator system acting for the local subset of transport network domains forms a part, the hierarchy comprising a lowest layer of coordinator entities each of which acts for a single transport network domain, and one or more higher layers of coordinators, a coordinator in a higher layer acting to exchange messages with coordinators in the next lower layer, whereby to aggregate admission control responses from the multiple transport network domains.

39. A system according to claim 38, wherein the coordinator system acts in a non-blocking mode, wherein the message interface, after receiving the at least one coordination request message, forwards the coordination request message to a next hop coordinator entity acting for a next neighbouring subset of one or more transport network domains.

40. A system according to claim 39, wherein message interface is further arranged in use to receive a coordination response message containing admission control response information from the next hop coordinator entity, the control element then generating, as the further coordination message, a coordination response message containing admission control response information generated in dependence on the local admission control response information and the received admission control response information, the message interface then transmitting the coordination response message.

41. A system according to claim 38, wherein for a coordinator entity acting in the lowest layer, the forwarding step comprises forwarding the admission control request message to an admission control interface of the transport network domain for which it acts.

42. A system according to claim 38, wherein for a coordinator entity acting in a layer other than the lowest layer, the forwarding step comprises forwarding the admission control request message fo a coordinator entity in the next layer down towards the transport networks.

43. A system of coordinating admission control signals across multiple transport network domains, comprising:
  at least one coordinator entity provided for a transport network domain and arranged to exchange admission control request and response messages with an admission control interface of the transport network domain for which it was provided;
  the coordinator entity being further arranged to exchange coordination request and response messages with other coordinator entities of the multiple transport network domains to combine the admission control responses of the domains;
  wherein the coordinator entity operates in a non-blocking mode, wherein a received coordination request message containing an admission control request is forwarded on to a next coordinator entity for a next-hop transport network domain prior to an admission control response being obtained from the network domain for which the coordinator entity acts;

wherein for a received coordination request message containing an admission control request an admission control response is obtained from the network domain for which the coordinator entity acts, which response is combined with an admission control response received in a coordination response message from the next coordinator entity for a next-hop transport network domain; and wherein the coordination response message is then forwarded to a previous coordinator entity for a previous-hop transport network domain.

44. A system according to claim 43, wherein the coordinator entity operates in a blocking mode, wherein for a received coordination request message containing an admission control request an admission control response is obtained from the network domain for which the coordinator entity acts, which response is combined with the admission control request before the coordination request message is forwarded on to a next coordinator entity for a next-hop transport network domain.

45. A system of coordinating admission control signals across multiple transport network domains, comprising:
   at least one coordinator entity provided for a transport network domain and arranged to exchange admission control request and response messages with an admission control interface of the transport network domain for which it was provided;
   the coordinator entity being further arranged to exchange coordination request and response messages with other coordinator entities of the multiple transport network domains to combine the admission control responses of the domains;
   wherein the coordinator entity operates in a blocking mode, wherein for a received coordination request message containing an admission control request an admission control response is obtained from the network domain for which the coordinator entity acts, which response is combined with the admission control request before the coordination request message is forwarded on to a next coordinator entity for a next-hop transport network domain;
   wherein the coordinator entity combines the admission control responses by:
   comparing the admission control response of the network domain for which it acts with one of:—
   i) in blocking mode, the admission control request information; or
   ii) in non-blocking mode, the admission control response information received in the coordination response message;
   determining that information of the compared information which represents the minimum of the two; and
   producing the further coordination message containing admission control request or response information corresponding to the determined minimum information.

46. A system according to claim 45, wherein the coordinator entity operates in a non-blocking mode, wherein a received coordination request message containing an admission control request is forwarded on to a next coordinator entity for a next-hop transport network domain prior to an admission control response being obtained from the network domain for which the coordinator entity acts.

47. A system according to claim 46, wherein for a received coordination request message containing an admission control request an admission control response is obtained from the network domain for which the coordinator entity acts, which response is combined with an admission control response received in a coordination response message from the next coordinator entity for a next-hop transport network domain.

48. A system according to claim 43, wherein a hierarchy of coordinator entities are provided, the hierarchy comprising a lowest layer of coordinator entities each of which acts for a single transport network domain, and one or more higher layers of coordinators, a coordinator in a higher layer acting to exchange messages with coordinators in the next lower layer, whereby to aggregate admission control responses from the multiple transport network domains.

49. A system according to claim 43, wherein the admission control response messages contain information indicating the status and/or characteristics of granted transport network reservation(s) made at the transport network domains in response to the admission control request messages.

50. A system according to claim 43, wherein the admission control request messages contain information including a flow QoS description of requested QoS.

51. A system according to claim 50, wherein the flow QoS description comprises a first part indicating the requested or granted QoS type, and a second part comprising one or more requested QoS parameters.

52. A system according to claim 51, wherein the requested QoS type comprises an end-to-end type selected from the group comprising: elastic; real-time tolerant; and real-time intolerant.

53. A system according to claim 51, wherein the requested QoS parameters comprise one or more selected from the following: average rate; peak rate; burstiness; minimum packet size; and maximum packet size.

54. A system according to claim 43, wherein the admission control response messages contain information including a flow QoS description of granted QoS.

* * * * *